(12) United States Patent
Fujita et al.

(10) Patent No.: US 11,577,673 B2
(45) Date of Patent: Feb. 14, 2023

(54) MOTOR MODULE, MANAGEMENT MODULE, VEHICLE-MOUNTED DEVICE CONTROL SYSTEM

(71) Applicants: Atsushi Fujita, Aichi (JP); Katsunori Kigoshi, Aichi (JP)

(72) Inventors: Atsushi Fujita, Aichi (JP); Katsunori Kigoshi, Aichi (JP)

(73) Assignee: NIDEC MOBILITY CORPORATION, Aichi (JP)

( * ) Notice: Subject to any disclaimer, the term of this patent is extended or adjusted under 35 U.S.C. 154(b) by 0 days.

(21) Appl. No.: 17/471,164

(22) Filed: Sep. 10, 2021

(65) Prior Publication Data

US 2022/0080904 A1   Mar. 17, 2022

(30) Foreign Application Priority Data

Sep. 11, 2020 (JP) .............................. JP2020-153316

(51) Int. Cl.
| | |
|---|---|
| *B60R 16/02* | (2006.01) |
| *B60R 16/023* | (2006.01) |
| *H04L 67/12* | (2022.01) |
| *E05F 15/60* | (2015.01) |
| *H02P 29/40* | (2016.01) |

(52) U.S. Cl.
CPC .......... *B60R 16/0231* (2013.01); *E05F 15/60* (2015.01); *H02P 29/40* (2016.02); *H04L 67/12* (2013.01); *E05Y 2201/434* (2013.01); *E05Y 2400/40* (2013.01); *E05Y 2900/55* (2013.01)

(58) Field of Classification Search
CPC ...... B60R 16/0231; E05F 15/60; E05F 15/41; E05F 15/695; E05F 15/77; H02P 29/40; H04L 67/12; E05Y 2201/434; E05Y 2400/40; E05Y 2900/55; E05Y 2400/456; E05Y 2900/148
See application file for complete search history.

(56) References Cited

U.S. PATENT DOCUMENTS

| | | | | |
|---|---|---|---|---|
| 2008/0022783 | A1* | 1/2008 | Maldener | H02K 29/08 |
| | | | | 318/539 |
| 2012/0025643 | A1* | 2/2012 | Shibusawa | H02K 11/38 |
| | | | | 310/71 |
| 2022/0081952 | A1* | 3/2022 | Fujita | E05F 17/00 |

FOREIGN PATENT DOCUMENTS

| | | |
|---|---|---|
| JP | 2006256547 A | 9/2006 |
| JP | 2013192012 A | 9/2013 |

(Continued)

*Primary Examiner* — Xiao En Mo
(74) *Attorney, Agent, or Firm* — Hauptman Ham, LLP

(57) ABSTRACT

A motor module includes: a motor; a driving unit; a control unit; a communication unit that performs communication via a network in the vehicle; and a connection unit to which an operation module is connected without going through the network. The control unit determines identification information of a vehicle-mounted device based on a voltage applied according to a connection state between the motor module and the operation module, controls the driving unit based on control information with information which coincides with the identification information transmitted from a management module that manages the motor module and received by the communication unit, and controls the driving unit to operate the vehicle-mounted device based on an operation signal input from the operation module according to an operation state of the operation module via the connection unit.

10 Claims, 21 Drawing Sheets

(56) References Cited

FOREIGN PATENT DOCUMENTS

| | | |
|---|---|---|
| JP | 201520647 A | 2/2015 |
| JP | 201520648 A | 2/2015 |
| JP | 2017133876 A | 8/2017 |
| WO | 2010110112 A1 | 9/2010 |

* cited by examiner

<DRIVER'S SEAT>

<FIRST SEAT>

<SECOND SEAT>

<THIRD SEAT>

FIG. 9

| | | INPUT PORT P1 | | | |
|---|---|---|---|---|---|
| | | EQUAL TO OR MORE THAN V3 | EQUAL TO OR MORE THAN V2 AND LESS THAN V3 | EQUAL TO OR MORE THAN V1 AND LESS THAN V2 | LESS THAN V1 |
| INPUT PORT P2 | EQUAL TO OR MORE THAN V3 | ABNORMAL | ABNORMAL | ABNORMAL | ABNORMAL |
| | EQUAL TO OR MORE THAN V2 AND LESS THAN V3 | ABNORMAL | IDENTIFICATION INFORMATION Ai FOR DRIVER'S SEAT | IDENTIFICATION INFORMATION Ci FOR SECOND SEAT | ABNORMAL |
| | EQUAL TO OR MORE THAN V1 AND LESS THAN V2 | ABNORMAL | IDENTIFICATION INFORMATION Bi FOR FIRST SEAT | IDENTIFICATION INFORMATION Di FOR THIRD SEAT | ABNORMAL |
| | LESS THAN V1 | ABNORMAL | ABNORMAL | ABNORMAL | ABNORMAL |

MOTOR MODULE, MANAGEMENT MODULE, VEHICLE-MOUNTED DEVICE CONTROL SYSTEM

CROSS-REFERENCE TO RELATED APPLICATIONS

This application is based upon and claims the benefit of priority from Japanese Patent Application No. 2020-153316 filed on Sep. 11, 2020, the entire contents of which are incorporated herein by reference.

FIELD

One or more embodiments of the present invention relate to a motor module that operates a vehicle-mounted device mounted on a vehicle, a management module that manages the motor module, and a vehicle-mounted device control system including the motor module and the management module.

BACKGROUND

In order to operate a vehicle-mounted device mounted on a vehicle such as an automobile, a motor module as disclosed in, for example, WO-A1-2010/110112 is used. This motor module is integrated with a motor, which is a power source for the vehicle-mounted device, a mechanism of decelerating a rotation of a rotary shaft of the motor, a sensor of detecting a rotation speed of the motor, a driving unit of driving the motor, a control unit of operating the driving unit to control the drive of the motor, and the like.

In addition to the above configuration, there is also a motor module integrated with a memory that stores information for operating the vehicle-mounted device, and a communication unit that communicates with another module or apparatus via a network such as LAN or CAN built in the vehicle. For example, JP-A-2015-020647 and JP-A-2015-020648 disclose a vehicle-mounted device control system including such a motor module (a slave device) and a management module (a master device) that manages the motor module. The management module is configured with an electronic control unit (ECU) including a control unit having a CPU or the like, a memory, a communication unit that performs communication via a network of a vehicle, and the like, or a module having other functions.

In order for the motor module to control an operation of the vehicle-mounted device and for the management module to control the motor module, it is necessary to perform initial settings. Therefore, in JP-A-2015-020647 and JP-A-2015-020648, identification information of the slave device and a driver (software) for the master device to control the slave device are stored in a memory of the slave device in advance. The slave device transmits the identification information and the driver stored in the memory of the slave device to the master device via the network. When the master device receives the identification information and the driver from the slave device, the master device associates the identification information and the driver, and stores the identification information and the driver in the memory. After that, the master device transmits a control command according to a condition indicated by the driver to the slave device together with identification information. The slave device receives the control command, controls an operation of a main body unit such as a motor based on the control command, and operates the vehicle-mounted device.

On the other hand, JP-A-2006-256547 and JP-A-2013-192012 disclose a technology in which a slave device determines identification information of the slave device based on a voltage applied from a master device or another slave device. Specifically, a resistance circuit provided in a plurality of slave devices is connected in series to an electric wire connected to a voltage supply unit provided in the master device, and a voltage is applied to the electric wire from the voltage supply unit. Then, the slave device determines the identification information of the slave device, based on a voltage division value of a resistance circuit of the slave device.

Further, JP-A-2017-133876 discloses a technology of identifying a slave device based on an open-circuited and short-circuited state of an identification terminal of a master device (main unit) to which the slave device (module) is directly connected. Specifically, by connecting any two of the three identification terminals respectively provided in a plurality of connectors provided on the master device and two connection terminals provided on the slave device, the open-circuited and short-circuited state between the identification terminals is changed. The master device determines a connector to which the slave device is connected, a type of the slave device corresponding to the connector, or a CAN ID, based on the open-circuited and short-circuited state between the identification terminals.

SUMMARY

For example, since a plurality of vehicle-mounted devices such as a power window mechanism are mounted on a vehicle, a plurality of motor modules having identical specifications and performance may be used as a power source for each vehicle-mounted device. Such a plurality of vehicle-mounted devices having identical types have physical individual differences such as a shape or a friction coefficient between members. Specifically, for example, in the power window mechanisms respectively provided in a front seat and a rear seat of the vehicle, shapes and weights of a window glass of the front seat and a window glass of the window glass of the rear seat are different from each other, and the friction coefficients between each window glass and the peripheral members are also different. Further, even in the power window mechanism respectively provided in vehicles having different types, for example, a shape and a weight of a window glass of a front seat of one vehicle and a window glass of a front seat of the other vehicle are different, and the friction coefficients between each window glass and the peripheral members are also different.

Therefore, in order to operate the plurality of vehicle-mounted devices of the identical types by the plurality of motor modules having the identical specifications and performance, each motor module needs to recognize the corresponding vehicle-mounted device and control the drive of the motor so that the vehicle-mounted device operates correctly. For this purpose, it is conceivable to store the identification information of the corresponding vehicle-mounted device in the memory of each motor module in advance. Meanwhile, in this case, in order to install the plurality of motor modules so that the corresponding vehicle-mounted device operates correctly, it is necessary to manage the plurality of motor modules separately by making component numbers of the respective motor modules different, which makes the handling complicated.

According to one or more embodiments of the present invention, in a case where a plurality of vehicle-mounted devices having identical types are operated by a plurality of motor modules having identical specifications and performance, it is possible to easily manage the plurality of motor modules, and to prevent handling from becoming complicated.

According to an aspect of the present invention, there is provided a motor module includes: a motor that is a power source of a vehicle-mounted device mounted on a vehicle; a driving unit that drives the motor; a control unit that operates the driving unit and controls the drive of the motor to operate the vehicle-mounted device; a communication unit that performs communication via a network built in the vehicle; and a connection unit to which an operation module that operates for operating the vehicle-mounted device is connected without going through the network. The control unit determines identification information of the corresponding vehicle-mounted device, based on a voltage applied according to a connection state between the motor module and the operation module, and controls the drive of the motor by the driving unit to operate the vehicle-mounted device, based on control information to which information which coincides with the identification information of the vehicle-mounted device is attached, among pieces of control information transmitted from a management module that manages the motor module and received by the communication unit. Further, the control unit controls the drive of the motor by the driving unit to operate the vehicle-mounted device, based on an operation signal input from the operation module according to an operation state of the operation module via the connection unit.

In addition, according to another aspect of the present invention, there is provided a management module that communicates with a motor module including a motor which is a power source of a vehicle-mounted device mounted on a vehicle via a network built in the vehicle to manage the motor module, the management module including: a storage unit in which identification information of the vehicle-mounted device is stored in advance. The management module receives identification information of the vehicle-mounted device transmitted from the motor module via the network; and in a case where the received identification information coincides with the identification information stored in the storage unit, attaches the identification information to control information for controlling a drive of the motor and operating the vehicle-mounted device, and transmits the control information to the motor module via the network.

In addition, according to still another aspect of the present invention, there is provided a vehicle-mounted device control system including: a motor module that includes a motor which is a power source of a vehicle-mounted device mounted on a vehicle, and controls a drive of the motor to operate the vehicle-mounted device; and a management module that manages the motor module, the motor module and the management module communicating with each other via a network built in the vehicle, in which the motor module determines identification information of the vehicle-mounted device, and transmits the identification information to the management module via the network. The management module includes a storage unit in which identification information of the vehicle-mounted device is stored in advance, and receives the identification information of the vehicle-mounted device transmitted from the motor module via the network, in a case where the received identification information coincides with the identification information stored in the storage unit, attaches the identification information to control information for controlling the drive of the motor and operating the vehicle-mounted device, and transmits the control information to the motor module via the network. The motor module controls the drive of the motor to operate the vehicle-mounted device, based on control information to which information which coincides with the determined identification information of the vehicle-mounted device is attached, among the pieces of control information received from the management module via the network.

According to the above configuration, the motor module determines the identification information of the corresponding vehicle-mounted device, based on the voltage applied according to the connection state with the operation module. The motor module not only controls the drive of the motor based on the operation signal input from the operation module to operate the corresponding vehicle-mounted device, but also controls the drive of the motor to operate the corresponding vehicle-mounted device based on control information to which information which coincides with the identification information of the corresponding vehicle-mounted device is attached, among the pieces of control information transmitted from the management module and received via the network. Therefore, the motor module can control the drive of the motor to appropriately operate the vehicle-mounted device, based on the control information for the corresponding vehicle-mounted device. As a result, even when there are physical individual differences between a plurality of vehicle-mounted devices having identical types, in order to operate each of the vehicle-mounted devices, by using a plurality of motor modules having identical specifications and performance, it is possible to appropriately operate each of the vehicle-mounted devices by the respective motor modules. Further, in order to operate the vehicle-mounted devices having identical types regardless of a type of the vehicle or a location at which the vehicle is installed, by using the motor modules having identical specifications and performance, it is possible to appropriately operate the vehicle-mounted device by the motor module. Further, it is not necessary to store the identification information of each of the vehicle-mounted devices in the memory of each of the motor modules in advance, and it is sufficient to install one of the motor modules in any of the vehicle-mounted devices. Therefore, it is not necessary to manage the plurality of motor modules separately by different component numbers of the plurality of motor modules, and the installation of the motor modules becomes easy.

According to one or more embodiments of the present invention, in a case where a plurality of vehicle-mounted devices having identical types are operated by a plurality of motor modules having identical specifications and performance, it is possible to facilitate management of the plurality of motor modules and to prevent handling from becoming complicated.

BRIEF DESCRIPTION OF DRAWINGS

FIG. 9 is a diagram illustrating another method of determining the identification information of the motor module in FIG. 1;

DETAILED DESCRIPTION

Figure 1:
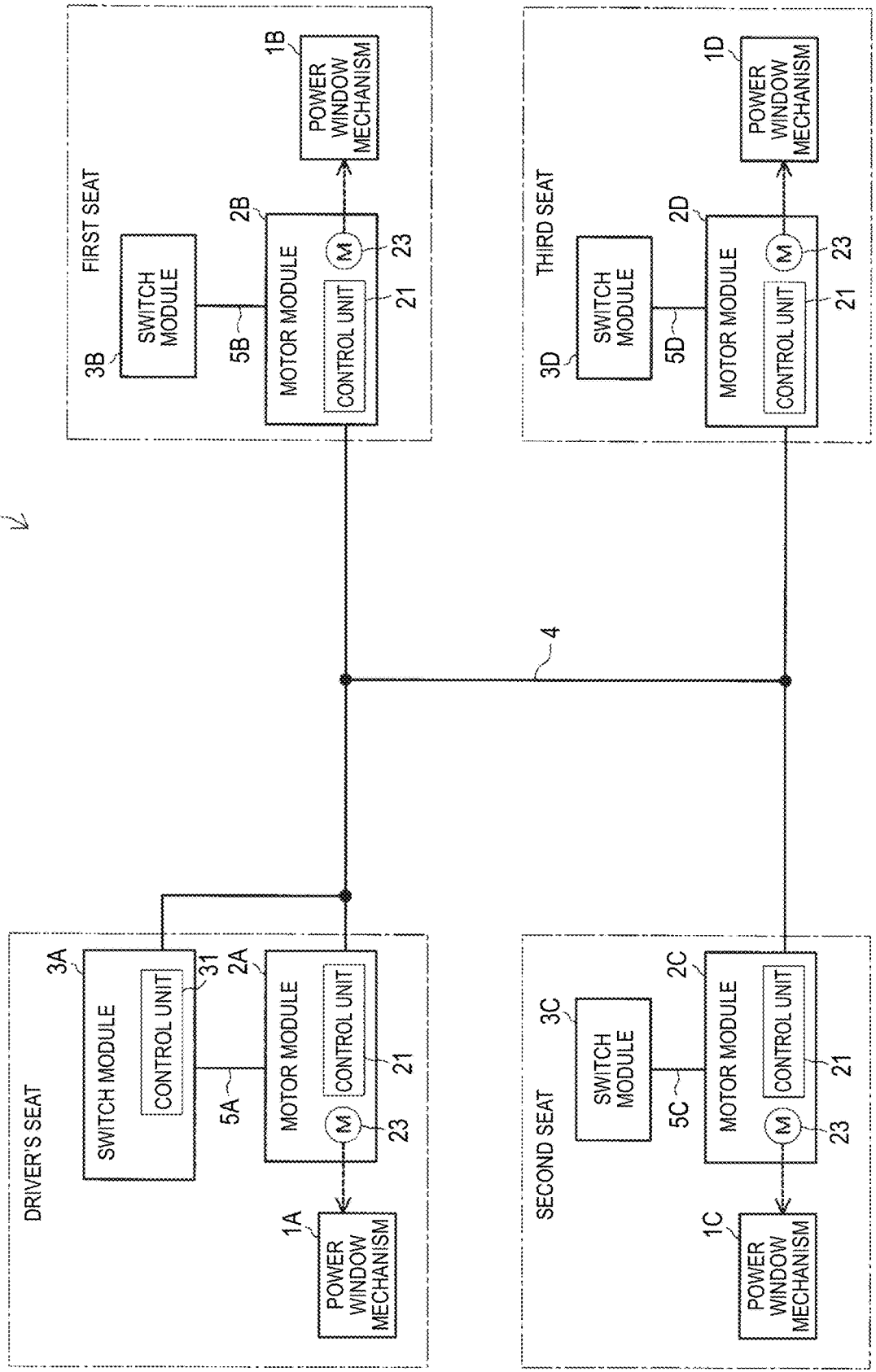
FIG. 1 is a schematic view of a power window system of an embodiment.

In embodiments of the invention, numerous specific details are set forth in order to provide a thorough understanding of the invention. However, it will be apparent to one of ordinary skill in the art that the invention may be practiced without these specific details. In other instances, well-known features have not been described in detail to avoid obscuring the invention.

Hereinafter, embodiments of the present invention will be described with reference to the drawings. In each drawing, the same portions or corresponding portions will be denoted the same reference numeral.

First, a configuration of a power window system of the embodiment will be described.

FIG. 1 is a schematic view of a power window system 100. The power window system 100 is mounted on a vehicle including an automatic four-wheeled vehicle. The power window system 100 includes a plurality of power window mechanisms 1A, 1B, 1C, and 1D, a plurality of motor modules 2A, 2B, 2C, and 2D, a plurality of switch modules 3A, 3B, 3C, and 3D, and a network 4.

The power window mechanism 1A, the motor module 2A, and the switch module 3A are installed in a driver's seat of the vehicle. The power window mechanism 1B, the motor module 2B, and the switch module 3B are installed in a first seat (for example, an assistant seat) of the vehicle. The power window mechanism 1C, the motor module 2C, and the switch module 3C are installed in a second seat (for example, a left rear seat) of the vehicle. The power window mechanism 1D, the motor module 2D, and the switch module 3D are installed in a third seat (for example, a right rear seat) of the vehicle.

The network 4 is configured with a wired local area network (LAN) built in the vehicle. The respective motor modules 2A, 2B, 2C, and 2D, and the switch module 3A in the driver's seat are connected to the network 4. As another example, instead of the LAN, a controller area network (CAN), a local interconnect network (LIN), or a wired or wireless network other than the CAN and the LIN may be provided in the vehicle.

The power window mechanisms 1A, 1B, 1C, and 1D are configured with a window glass of each window of the driver's seat, the first seat, the second seat, and the third seat of the vehicle, a mechanism that moves the window glass to open and close the window, and the like. The power window mechanisms 1A, 1B, 1C, and 1D have physical individual differences such as a shape or a friction coefficient between members. The power window mechanisms 1A, 1B, 1C, and 1D are examples of a "vehicle-mounted device" according to the embodiment of the present invention. The power window system 100 is an example of a "vehicle-mounted device control system" according to the embodiment of the present invention.

The motor modules 2A, 2B, 2C, and 2D have a motor 23, that is a power source of respectively operating the corresponding power window mechanisms 1A, 1B, 1C, and 1D, a control unit 21, and the like (details will be described below). The respective motor modules 2A, 2B, 2C, and 2D have identical specifications and performance. In FIG. 1, for convenience, components provided in each of the motor modules 2A, 2B, 2C, and 2D are denoted by the same reference numerals (the same applies to FIGS. 2 to 5 and 11 to 18, which will be described below).

The switch modules 3A, 3B, 3C, and 3D have a plurality of switches which operate in a case of causing the corresponding power window mechanisms 1A, 1B, 1C, and 1D to open and close the window (illustrated in FIGS. 2 to 5, and details will be described below). The switch module 3A in the driver's seat also includes a plurality of switches (illustrated in FIGS. 2 to 5) for remotely operating the power window mechanisms 1B, 1C, and 1D in the other seats located away from the driver's seat, a control unit 31, or the like (details will be described below). The corresponding motor modules 2A, 2B, 2C, and 2D and the switch modules 3A, 3B, 3C, and 3D are respectively connected one-to-one by harnesses 5A, 5B, 5C, and 5D without going through the network 4.

The switch module 3A in the driver's seat communicates with the motor modules 2A, 2B, 2C, and 2D of each seat via the network 4, and manages the motor modules 2A, 2B, 2C, and 2D. The switch module 3A in the driver's seat is an example of a "management module" and an "operation module" according to the embodiment of the present invention. The switch modules 3B, 3C, and 3D in the other seats are examples of the "operation module" according to the embodiment of the present invention.

Next, configurations of the respective motor modules 2A, 2B, 2C, and 2D and the switch modules 3A, 3B, 3C, and 3D will be described in detail.

Figure 2:
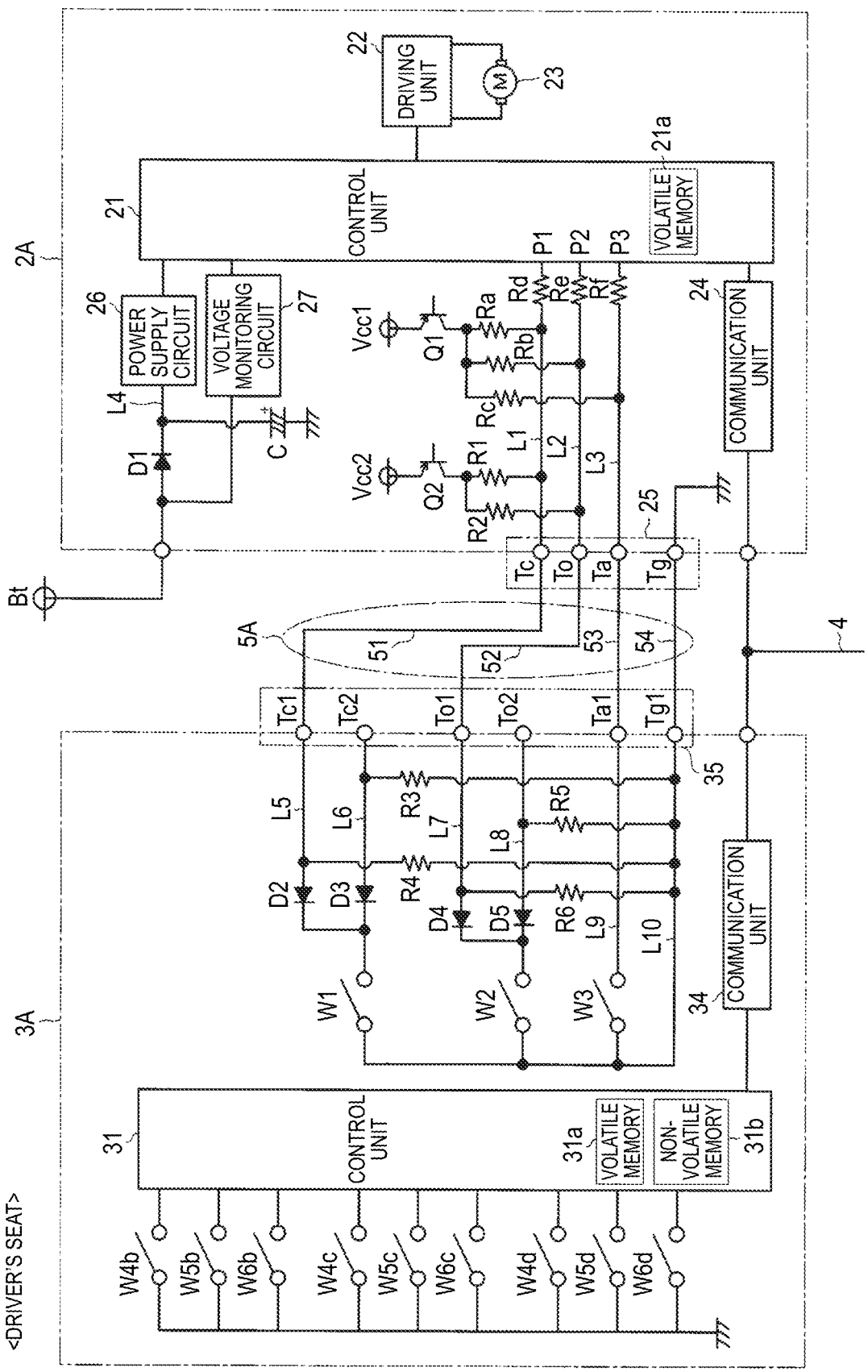
FIG. 2 is a detailed schematic view of a switch module and a motor module in a driver's seat in FIG. 1.
Figure 3:
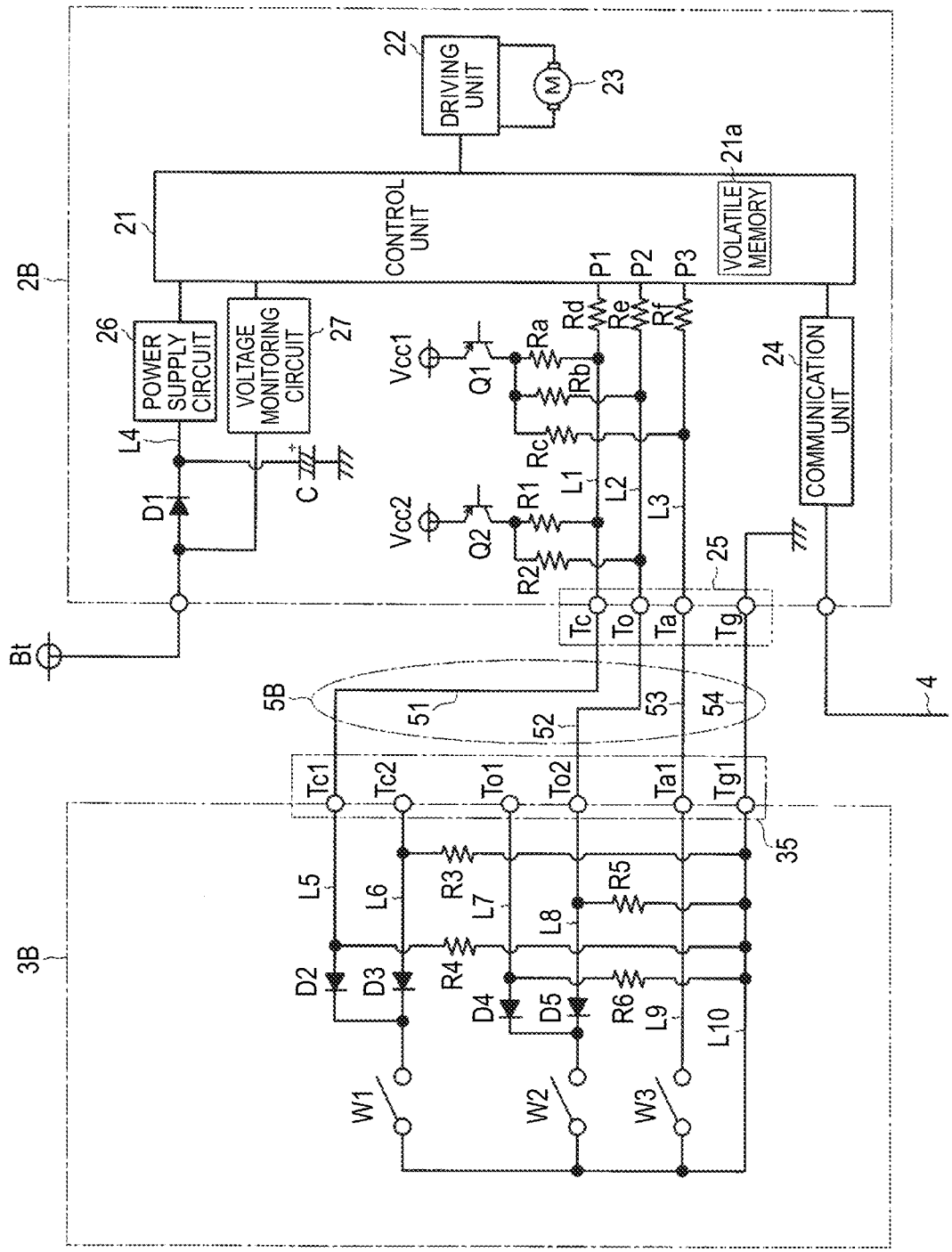
FIG. 3 is a detailed schematic view of a switch module and a motor module of a first seat in FIG. 1.
Figure 4:
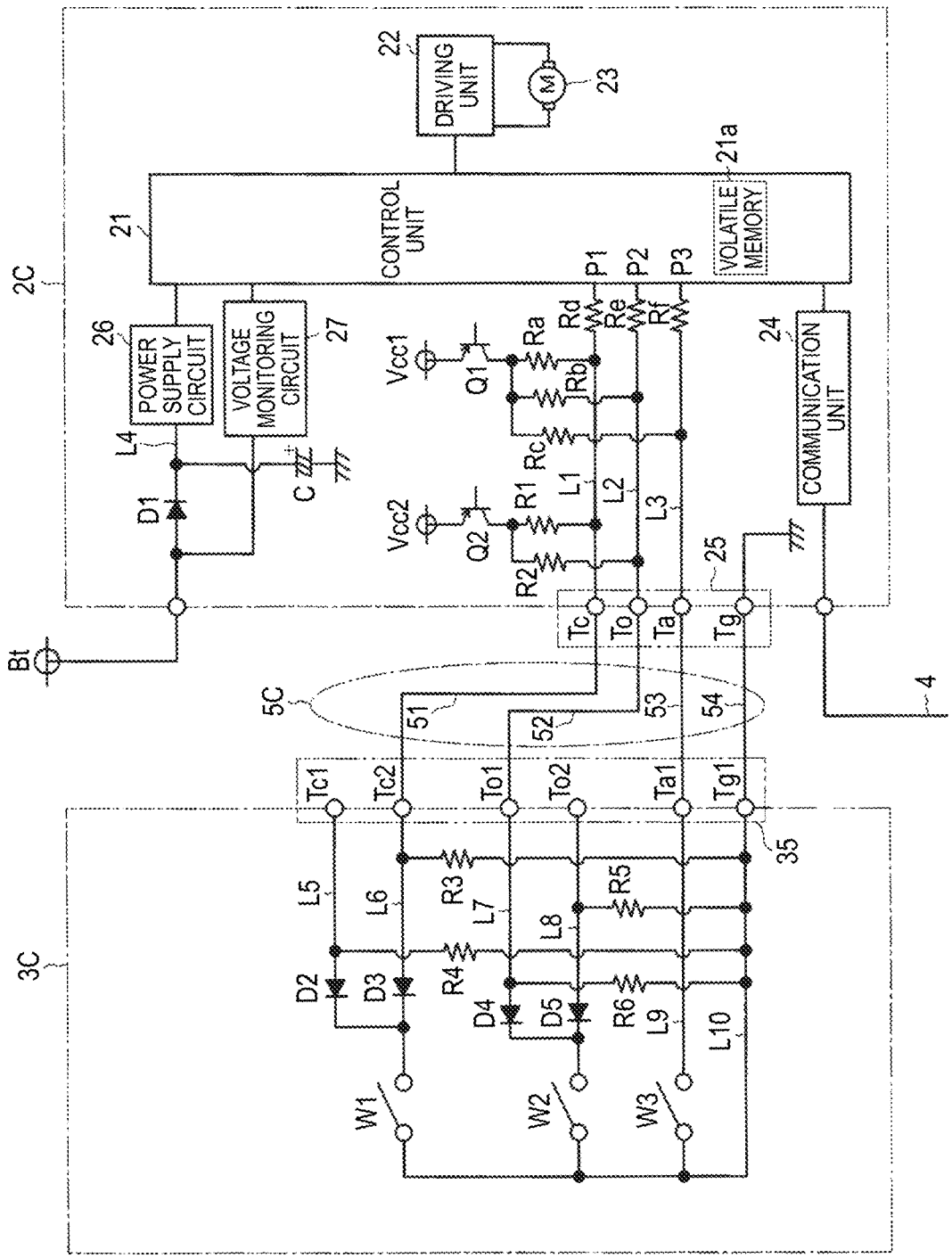
FIG. 4 is a detailed schematic view of a switch module and a motor module of a second seat in FIG. 1.
Figure 5:
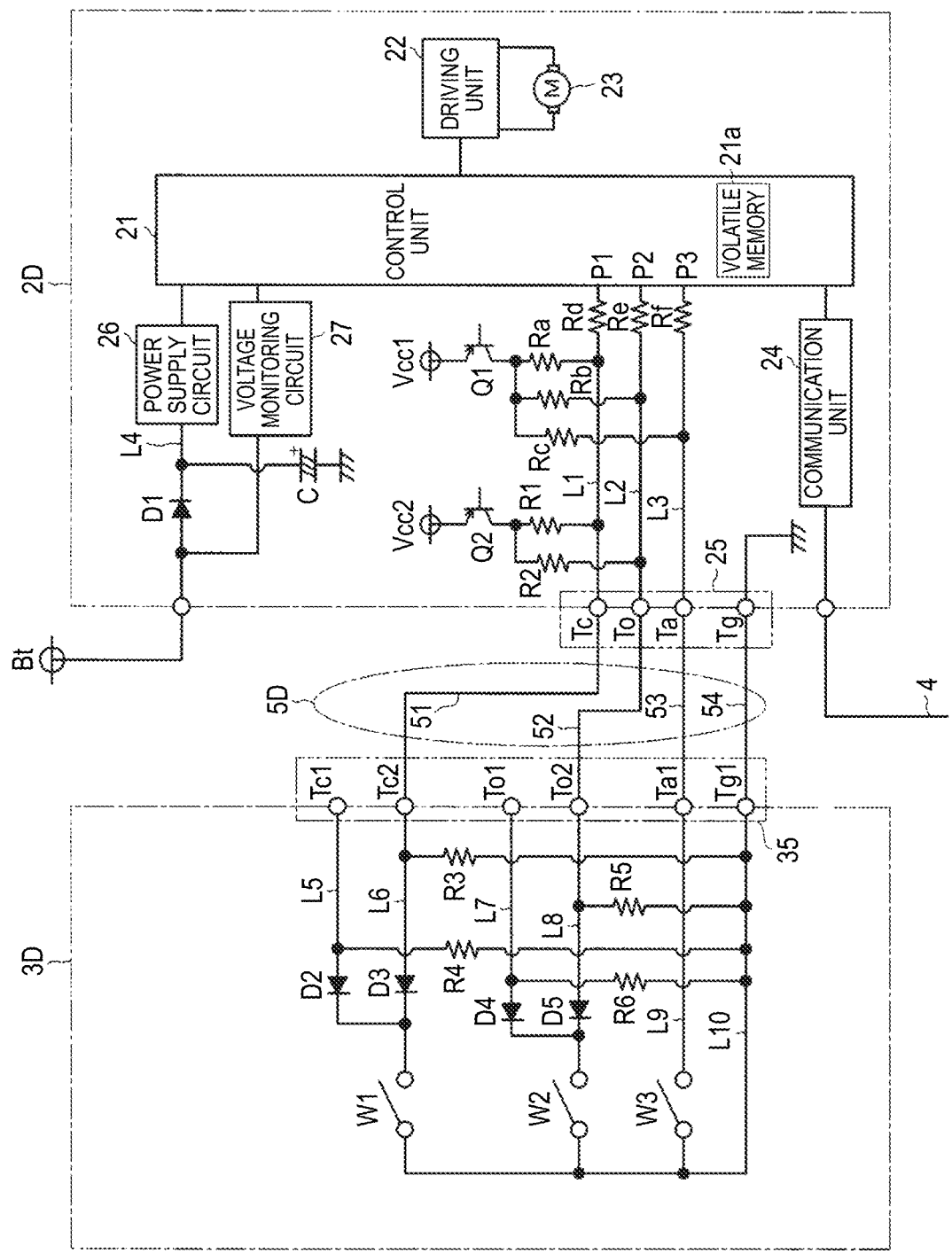
FIG. 5 is a detailed schematic view of a switch module and a motor module of a third seat in FIG. 1.

FIG. 2 is a schematic view of the motor module 2A and the switch module 3A in the driver's seat. FIG. 3 is a schematic view of the motor module 2B and the switch module 3B in the first seat. FIG. 4 is a schematic view of the motor module 2C and the switch module 3C in the second seat. FIG. 5 is a schematic view of the motor module 2D and the switch module 3D in the third seat. In FIGS. 2 to 5, for convenience, the corresponding portions are denoted by the same reference numerals.

As illustrated in FIGS. 2 to 5, the motor modules 2A, 2B, 2C, and 2D in the respective seats include the control unit 21, a driving unit 22, the motor 23, a communication unit 24, a connection unit 25, a power supply circuit 26, a voltage monitoring circuit 27, and the like.

The control unit 21 includes a CPU or the like, and has a volatile memory 21a inside. The driving unit 22 includes a circuit that drives the motor 23. The control unit 21 operates the driving unit 22 to control the drive of the motor 23 and operate the corresponding power window mechanisms 1A, 1B, 1C, and 1D (FIG. 1). The volatile memory 21a stores information for operating the corresponding motor 23 and power window mechanisms 1A, 1B, 1C, and 1D. The communication unit 24 includes a circuit of performing communication via the network 4. Control information or the like for the corresponding power window mechanisms 1A, 1B, 1C, and 1D to perform an opening and closing operation by controlling the drive of the motor 23 by the driving unit 22 is transmitted from the switch module 3A in the driver's seat, and received by the communication unit 24 via the network 4.

The connection unit 25 includes a connector of respectively connecting the corresponding switch modules 3A, 3B, 3C, and 3D by the harnesses 5A, 5B, 5C, and 5D. The connection unit 25 is provided with a plurality of terminals Tc, To, Ta, and Tg. One ends of the respective electric wires 51, 52, 53, and 54 provided in the harnesses 5A, 5B, 5C, and 5D are connected to the respective terminals Tc, To, Ta, and Tg.

The terminals Tc, To, Ta, and the input ports P1, P2, and P3 of the control unit 1 are respectively connected by internal wirings L1, L2, and L3. Resistors Rd, Re, and Rf are respectively provided on the internal wirings L1, L2, and L3. Further, one end of the resistor Ra and one end of the resistor R1 are respectively connected between the resistor Rd on the internal wiring L1 and the terminal Tc. One end of the resistor Rb and one end of the resistor R2 are respectively connected between the resistor Re on the internal wiring L2 and the terminal To. One end of the resistor Rc is connected between the resistor Rf on the internal wiring L3 and the terminal Ta. The other ends of the resistors Ra, Rb, and Rc are connected to a power supply Vcc1 via a switching element Q1. The other ends of the resistors R1 and R2 are connected to a power supply Vcc2 via a switching element Q2. The terminal Tg is grounded to the ground.

A rectifier diode D1 and the power supply circuit 26 are provided on an internal wiring LA for power supply from a vehicle-mounted battery Bt mounted on the vehicle to the control unit 21. The power supply circuit 26 is located on a cathode side of the rectifier diode D1, and converts a high voltage output from the vehicle-mounted battery Bt into a predetermined low voltage to supply the voltage to the control unit 21. A power supply backup capacitor C is provided between the rectifier diode D1 and the power supply circuit 26. The voltage monitoring circuit 27 monitors a level of the voltage output from the vehicle-mounted battery Bt, a momentary interruption (temporary voltage drop), or the like.

The switch modules 3A, 3B, 3C, and 3D in the respective seats are provided with a connection unit 35, switches W1, W2, and W3, and the like. The connection unit 35 includes a connector for connecting the corresponding motor modules 2A, 2B, 2C, and 2D by the harnesses 5A, 5B, 5C, and 5D. The connection unit 35 is provided with a plurality of terminals Tc1, Tc2, To1, To2, Ta1, and Tg1. Among the terminals Tc1, Tc2, To1, To2, Ta1, and Tg1, the other end of the electric wire 53 of the harnesses 5A, 5B, 5C, and 5D and the other end of the electric wire 54 are respectively connected to the terminal Ta1 and the terminal Tg1.

In order for the motor modules 2A, 2B, 2C, and 2D to identify the switch modules 3A, 3B, 3C, and 3D connected to each, a connection state between each motor module and each switch module is different depending on the seat. Specifically, as illustrated in FIGS. 2 and 3, the other ends of the electric wires 51 of the harnesses 5A and 5B are respectively connected to the terminals Tc1 of the switch module 3A in the driver's seat and the switch module 3B in the first seat. As illustrated in FIGS. 4 and 5, the other ends of the electric wires 51 of the harnesses 5C and 5D are respectively connected to the terminals Tc2 of the switch module 3C of the second seat and the switch module 3D of the third seat.

Further, as illustrated in FIGS. 2 and 4, the other ends of the electric wires 52 of the harnesses 5A and 5C are respectively connected to the terminals To1 of the switch module 3A in the driver's seat and the switch module 3C in the second seat. As illustrated in FIGS. 3 and 5, the other ends of the electric wires 52 of the harnesses 5B and 5D are respectively connected to the terminals To2 of the switch module 3B of the first seat and the switch module 3D of the third seat. In this manner, four types of harnesses can be used so as to make the connection state of the motor module and the switch module different.

The switches W1, W2, W3 of each of the switch modules 3A, 3B, 3C, and 3D are turned on (short-circuited) or turned off (open-circuited) by a user to operate the corresponding power window mechanisms 1A, 1B, 1C, and 1D. Specifically, for example, when the corresponding power window mechanisms 1A, 1B, 1C, and 1D are manually closed, the switch W1 is turned on. Further, when the corresponding power window mechanisms 1A, 1B, 1C, and 1D are manually opened, the switch W2 is turned on. Further, when the corresponding power window mechanisms 1A, 1B, 1C, and 1D are automatically closed, the switch W1 and the switch W3 are turned on. Further, when the corresponding power window mechanisms 1A, 1B, 1C, and 1D are automatically opened, the switch W2 and the switch W3 are turned on. Further, when the manual opening and closing operation of the corresponding power window mechanisms 1A, 1B, 1C, and 1D is stopped, the switch W2 or the switch W1 is turned off. Further, when the automatic opening and closing operation of the corresponding power window mechanisms 1A, 1B, 1C, and 1D is stopped, the switch W2 or the switch W1 is turned on or off again.

The switch modules 3A, 3B, 3C, and 3D connected by the harnesses 5A, 5B, 5C, and 5D to the respective motor modules 2A, 2B, 2C, and 2D are examples of a "second switch module" according to the embodiment of the present invention.

In the switch modules 3A, 3B, 3C, and 3D, a rectifier diode D2 is provided on the internal wiring L5 of which one end is connected to the terminal Tc1. A rectifier diode D3 is provided on the internal wiring L6 of which one end is connected to the terminal Tc2. Each cathode of the rectifier diodes D2 and D3 is connected to one end of the switch W1.

A rectifier diode D4 is provided on the internal wiring L7 of which one end is connected to the terminal To1. A rectifier diode D5 is provided on the internal wiring L8 of which one end is connected to the terminal To2. Each cathode of the rectifier diodes D4 and D5 is connected to one end of the switch W2.

The other end of the internal wiring L9 of which one end is connected to the terminal Ta1 is connected to one end of the switch W3. The other end of each of the switches W1, W2, and W3 is connected to the internal wiring L10. The terminal Tg1 is also connected to the internal wiring L10.

One end of the resistor R4 is connected to the internal wiring L5 between the terminal Tc1 and the rectifier diode D2. One end of the resistor R3 is connected to the internal wiring L6 between the terminal Tc2 and the rectifier diode D3. One end of the resistor R6 is connected to the internal wiring L7 between the terminal To1 and the rectifier diode D4. One end of the resistor R5 is connected to the internal wiring L8 between the terminal To2 and the rectifier diode D5. The other ends of the resistors R3, R4, R5, and R6 are connected to the internal wiring L10. Resistance values of the resistors R3 and R4 are different from each other. Further, resistance values of the resistors R5 and 6 are also different from each other.

At a time of initial setting, which will be described below, the switches W1, W2, and W3 of the switch modules 3A, 3B, 3C, and 3D are not turned on. At this time, in the motor module 2A in the driver's seat in FIG. 2 and the motor module 2B in the first seat in FIG. 3, the control unit 21 turns on the switching element Q2, so that a current from the power supply Vcc2 flows to the electric wire 51 of the harnesses 5A and 5B connected to the terminal Tc, through the resistor R1, the terminal Tc, and the like. The current passing through the electric wire 51 flows to the ground, through the terminal Tc1, the resistor R4, the terminal Tg1 of the switch module 3A in the driver's seat and the switch module 3B in the first seat, the electric wire 54 of the harnesses 5A and 5B connected to the terminal Tg1, the terminal Tg of the motor modules 2A and 2B, and the like.

Further, in the motor module 2C of the second seat in FIG. 4 and the motor module 2D of the third seat in FIG. 5, when the control unit 21 turns on the switching element Q2, a current from the power supply Vcc2 flows to the electric wire 51 of the harnesses 5C and 5D connected to the terminal Tc, through the resistor R1, the terminal Tc, and the like. The current passing through the electric wire 51 flows to the ground, through the terminal Tc2, the resistor R3, the terminal Tg1 of the switch module 3C of the second seat and the switch module 3D of the third seat, the electric wire 54 of the harnesses 5C and 5D connected to the terminal Tg1, the terminal Tg of the motor modules 2C and 2D, and the like.

Further, in the motor module 2A in the driver's seat in FIG. 2 and the motor module 2C in the second seat in FIG. 4, when the control unit 21 turns on the switching element Q2, a current from the power supply Vcc2 flows to the electric wire 52 of the harnesses 5A and 5C connected to the terminal To, through the resistor R2, the terminal To, and the like. The current passing through the electric wire 52 flows to the ground, through the terminal To1, the resistor R6, the terminal Tg1 of the switch module 3A in the driver's seat and the switch module 3C in the second seat, the electric wire 54 of the harnesses 5A and 5C connected to the terminal Tg1, the terminal Tg of the motor modules 2A and 2C, and the like.

Further, in the motor module 2B of the first seat in FIG. 3 and the motor module 2D of the third seat in FIG. 5, when the control unit 21 turns on the switching element Q2, a current from the power supply Vcc2 flows to the electric wire 52 of the harnesses 5B and 5D connected to the terminal To, through the resistor R2, the terminal To, and the like. The current passing through the electric wire 52 flows to the ground, through the terminal To2, the resistor R5, the terminal Tg1 of the switch module 3B of the first seat and the switch module 3D of the third seat, the electric wire 54 of the harnesses 5B and 5D connected to the terminal Tg1, the terminal Tg of the motor modules 2B and 2D, and the like.

As described above, a voltage is applied to the input ports P1 and P2 provided in the control unit 21 by the current flowing from the power supply Vcc2 of the motor modules 2A, 2B, 2C, and 2D to the ground, via the switch modules 3A, 3B, 3C, and 3D. The control unit 21 determines identification information of the corresponding power window mechanisms 1A, 1B, 1C, and 1D, based on the voltage value applied to the input ports P1 and P2 (details will be described below).

In an operation, which will be described below, in the motor modules 2A, 2B, 2C, and 2D, the control unit 21 turns on the switching element Q1, so that the current from the power supply Vcc1 flows to the electric wires 51, 52, and 53 of the harnesses 5A, 5B, 5C, and 5D connected to the terminals Tc, To, and Ta, through the resistors Ra, Rb, and Rc, the terminals Tc, To, Ta, and the like. In the switch modules 3A, 3B, 3C, and 3D, when the switches W1, W2, and W3 are not turned on, the current passing through the electric wires 51, 52, and 53 of the harnesses 5A, 5B, 5C, and 5D flows to the ground, through the terminals Tc1, Tc2, To1, To2, and Ta1, the resistors R4, R3, R6, and R5 connected to the electric wires 51, 52, and 53, the terminal Tg1, the electric wire 54 of the harnesses 5A, 5B, 5C, and 5D connected to the terminal Tg1, the terminal Tg of the motor modules 2A, 2B, 2C, and 2D, and the like.

In addition, when any of the switches W1, W2, and W3 is turned on, the current passing through the electric wires 51, 52, and 53 of the harnesses 5A, 5B, 5C, and 5D flows to the ground, through the terminals Tc1, Tc2, To1, To2, and Ta1 connected to the electric wires 51, 52, and 53, the on-operated switches W1, W2, and W3, the terminal Tg1, the electric wire 54 of the harnesses 5A, 5B, 5C, and 5D connected to the terminal Tg1, the terminal Tg of the motor modules 2A, 2B, 2C, and 2D, and the like.

As described above, a voltage is applied to the input ports P1, P2, and P3 provided in the control unit 21 by the current flowing from the power supply Vcc1 of the motor modules 2A, 2B, 2C, and 2D to the ground, via the switch modules 3A, 3B, 3C, and 3D. Further, a magnitude of the voltage applied to the input ports P1, P2, and P3 is changed, according to an operation state of the switches W1, W2, and W3. The control unit 21 regards the change in the voltage applied to the input ports P1, P2, and P3, as an operation signal input from the switch modules 3A, 3B, 3C, and 3D via the connection unit 25 according to the operation state of the switches W1, W2, and W3. The control unit 21 controls the drive of the motor 23 by the driving unit 22 based on the operation signal, and causes the corresponding power window mechanisms 1A, 1B, 1C, and 1D to open and close the window.

As illustrated in FIG. 2, in addition to the above-described configuration, the switch module 3A in the driver's seat includes the control unit 31, a communication unit 34, switches W4b, W5b, W6b, W4c, W5c, W6c, W4d, W5d, and W6d. The control unit 31 includes a CPU or the like, and has a volatile memory 31a and a non-volatile memory 31b inside. The volatile memory 31a and the non-volatile memory 31b are examples of a "storage unit" according to the embodiment of the present invention. The communication unit 34 includes a circuit for performing communication via the network 4. The control information or the like for causing the motor modules 2A, 2B, 2C to perform the opening and closing operation on the corresponding power window mechanisms 1A, 1B, 1C, and 1D, and 2D is transmitted by the communication unit 34 to the motor modules 2A, 2B, 2C, and 2D via the network 4.

The switches W4b, W5b, and W6b are turned on or off by the user, in order to remotely operate the power window mechanism 1B in the first seat. The switches W4c, W5c, and W6c are turned on or off by the user in order to remotely operate the power window mechanism 1C in the second seat. The switches W4d, W5d, and W6d are turned on or off by the user in order to remotely operate the power window mechanism 1D in the third seat. When the switches W4b, W4c, and W4d are turned on and off, the same operation as a case where the switch W1 of each seat is operated is performed. When the switches W5b, W5c, and W5d are turned on and off, the same operation as a case where the switch W2 of each seat is operated is performed. When the switches W6b, W6c, and W6d are turned on and off, the same operation as a case where the switch W3 of each seat is operated is performed.

The switch module 3A in the driver's seat is an example of a "first switch module" according to the embodiment of the present invention, as opposed to the motor modules 2B, 2C, and 2D in the other seats.

One end of each of the switches W4b, W5b, W6b, W4c, W5c, W6c, W4d, W5d, and W6d is connected to the control unit 31. The other end of each of the switches W4b, W5b, W6b, W4c, W5c, W6c, W4d, W5d, and W6d is grounded to the ground. The control unit 31 detects the on or off operation state of each of the switches W4b, W5b, W6b, W4c, W5c, W6c, W4d, W5d, and W6d. The control unit 31 generates operation command information for operating the power window mechanisms 1B, 1C, and 1D in the other seats according to the operation state, and causes the communication unit 34 to transmit the operation command information to the motor modules 2B, 2C, and 2D in the other seats via the network 4. The operation command information is an example of "control information" according to the embodiment of the present invention.

Next, an operation of the power window system 100 at a time of initial setting will be described.

Figure 6:
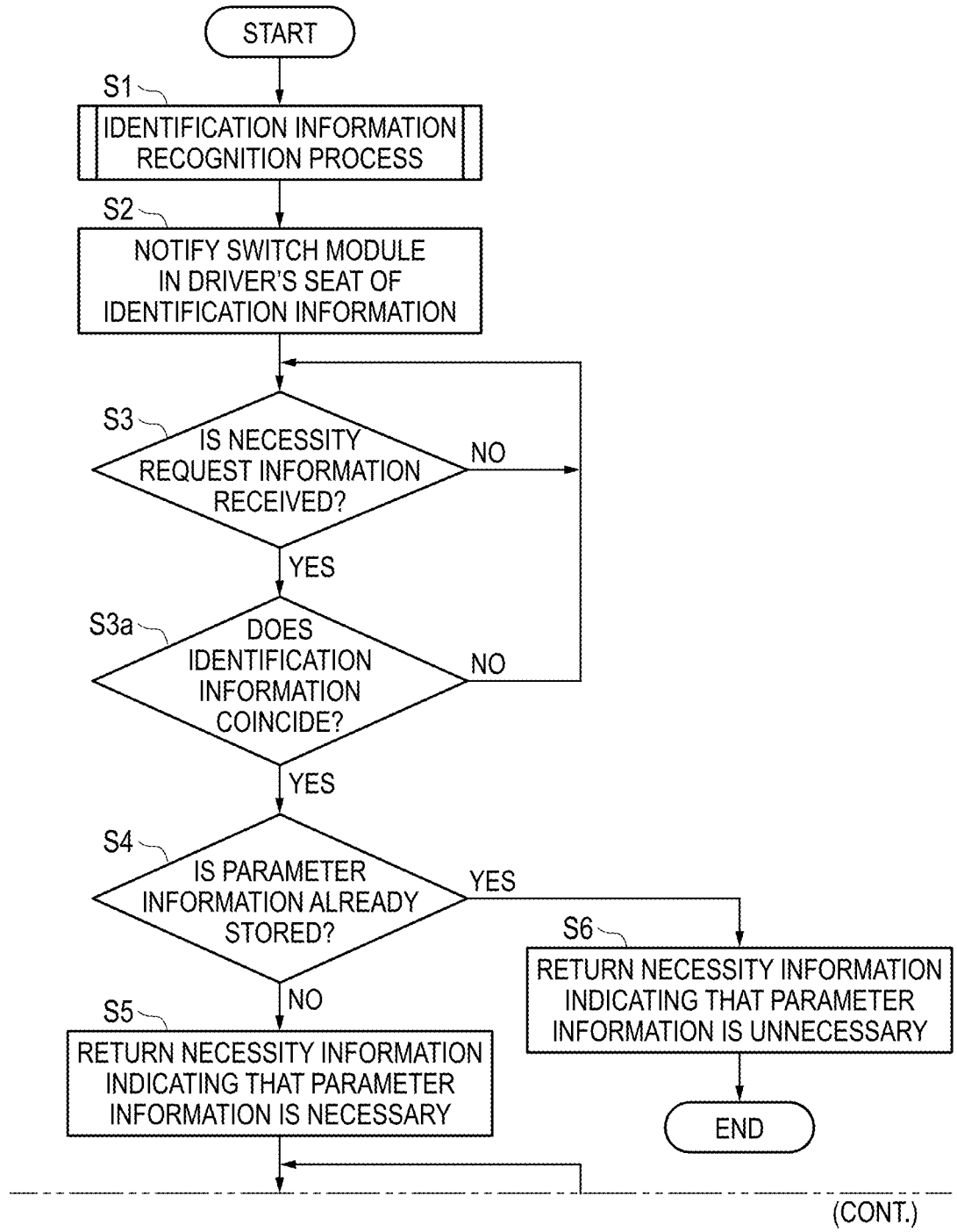
FIG. 6 is a flowchart illustrating an operation of the motor module in FIG. 1 at a time of initial setting.
Figure 6:
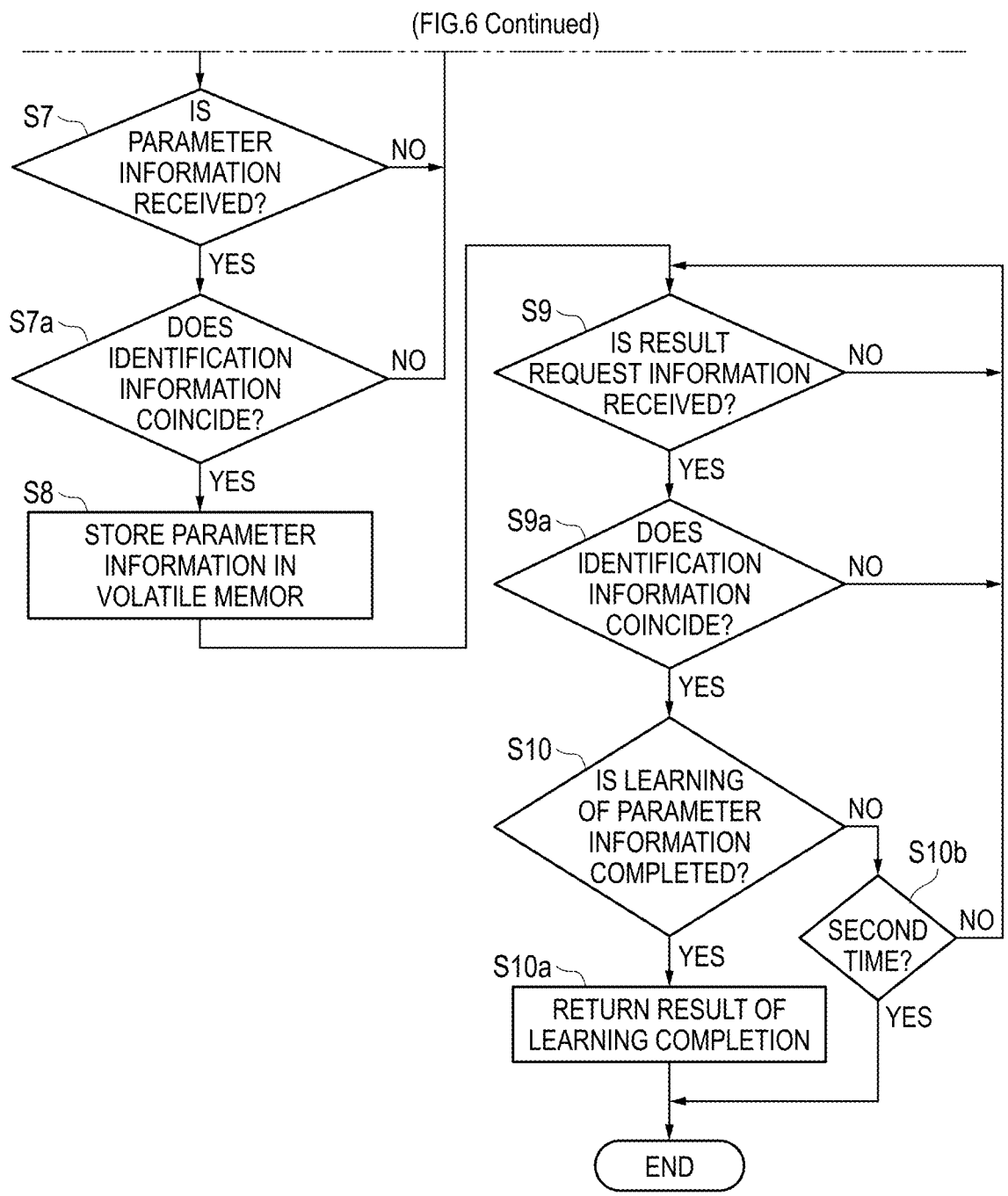
Figure 7:
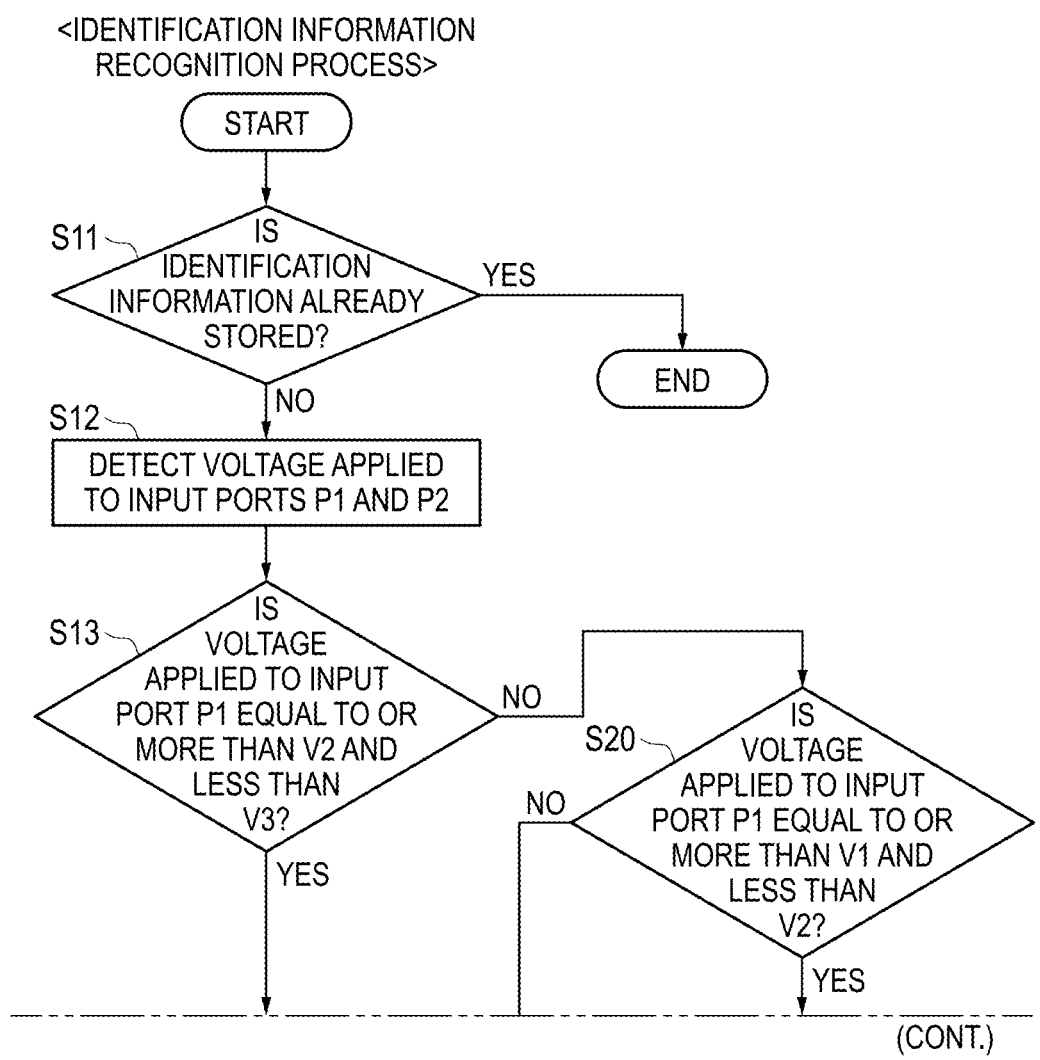
FIG. 7 is a flowchart illustrating details of an identification information recognition process in FIG. 6.
Figure 7:
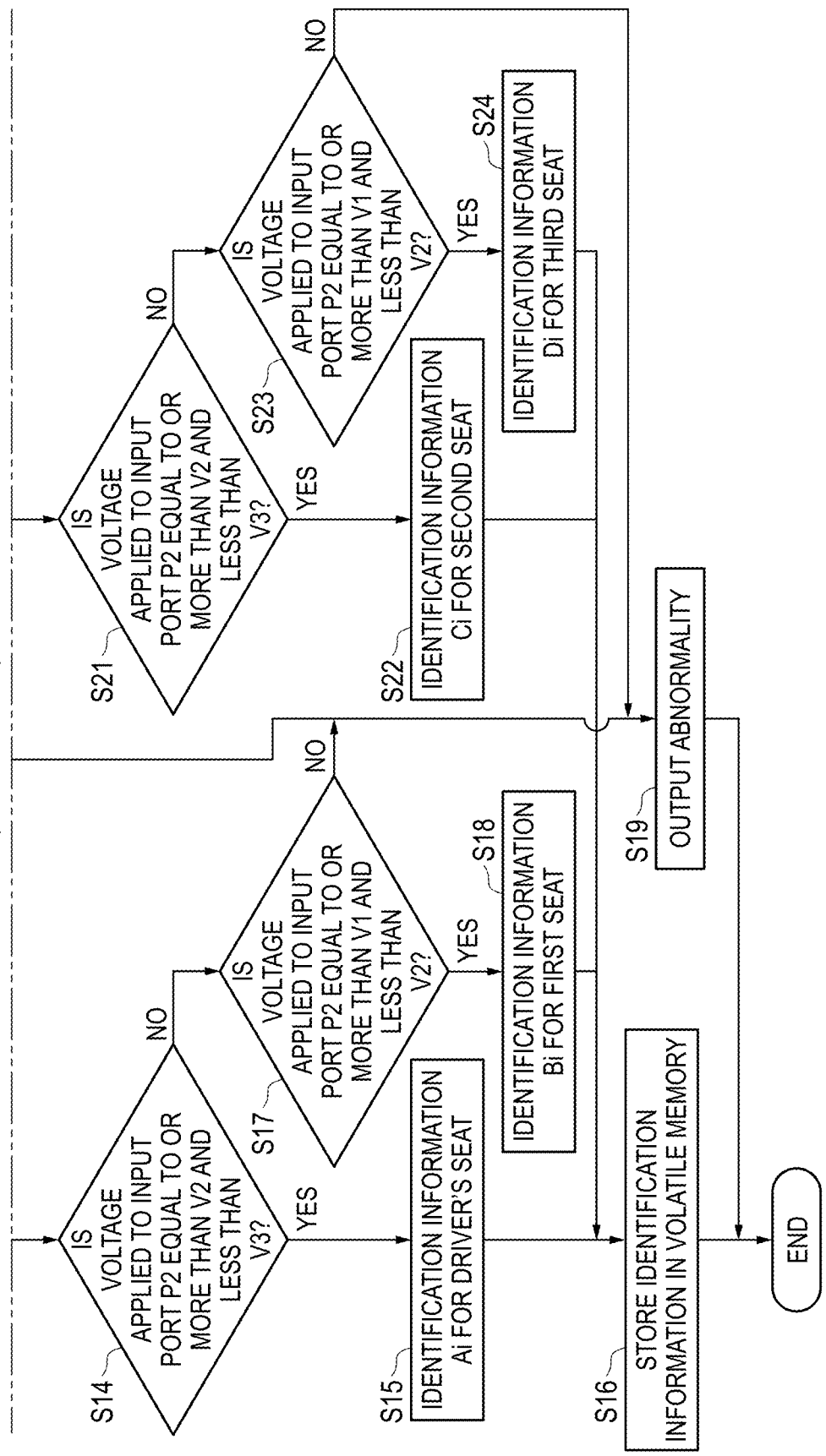
Figure 8:
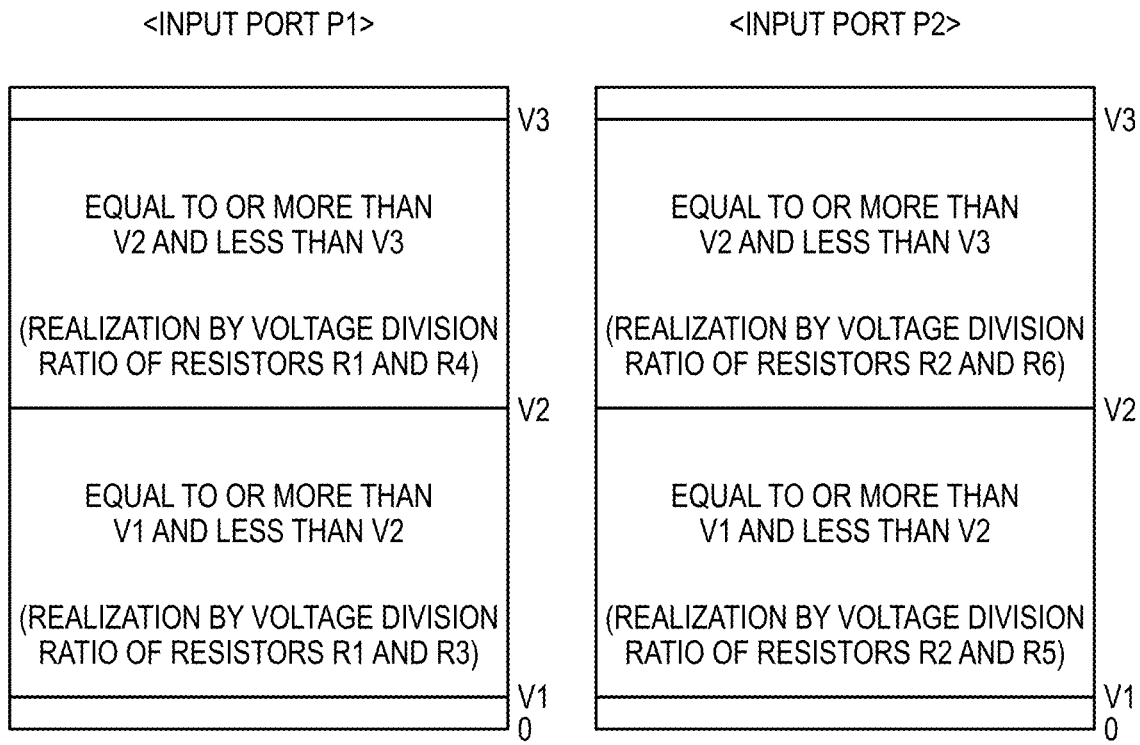
FIG. 8 is a diagram illustrating a method of determining identification information of the motor module in FIG. 1.
Figure 10:
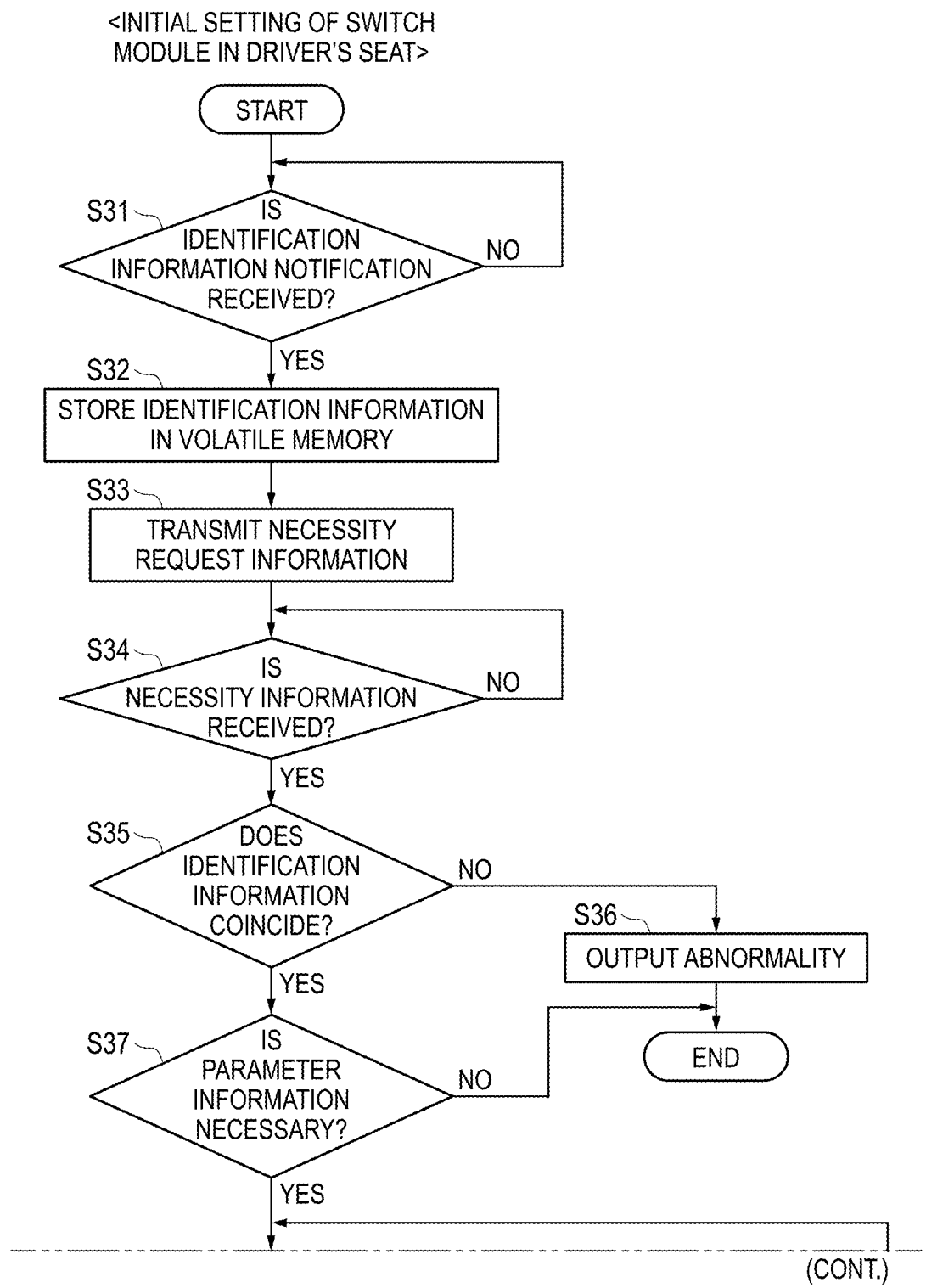
FIG. 10 is a flowchart illustrating an operation of the switch module in the driver's seat in FIG. 1 at a time of initial setting.
Figure 10:
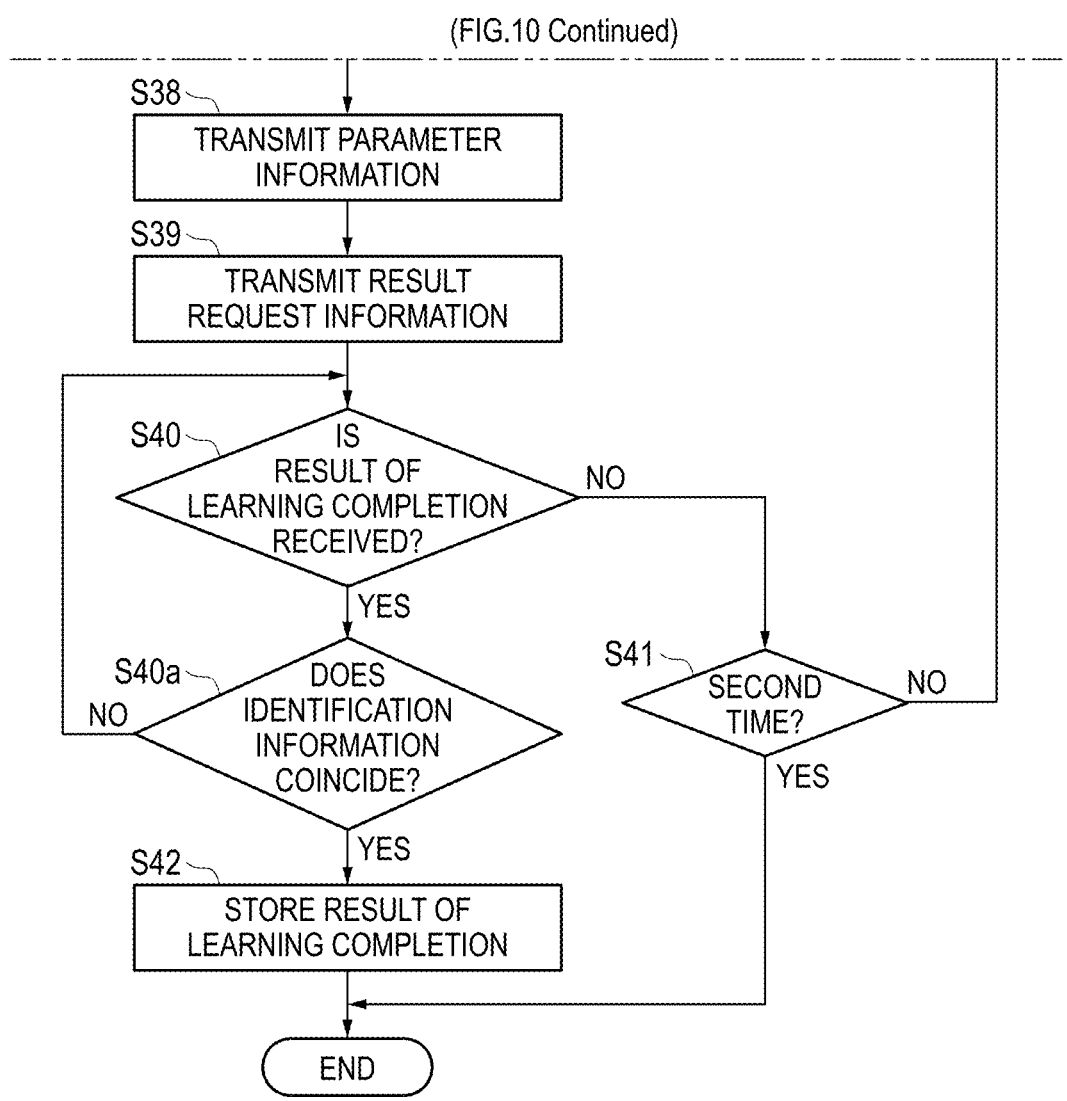
Figure 11:
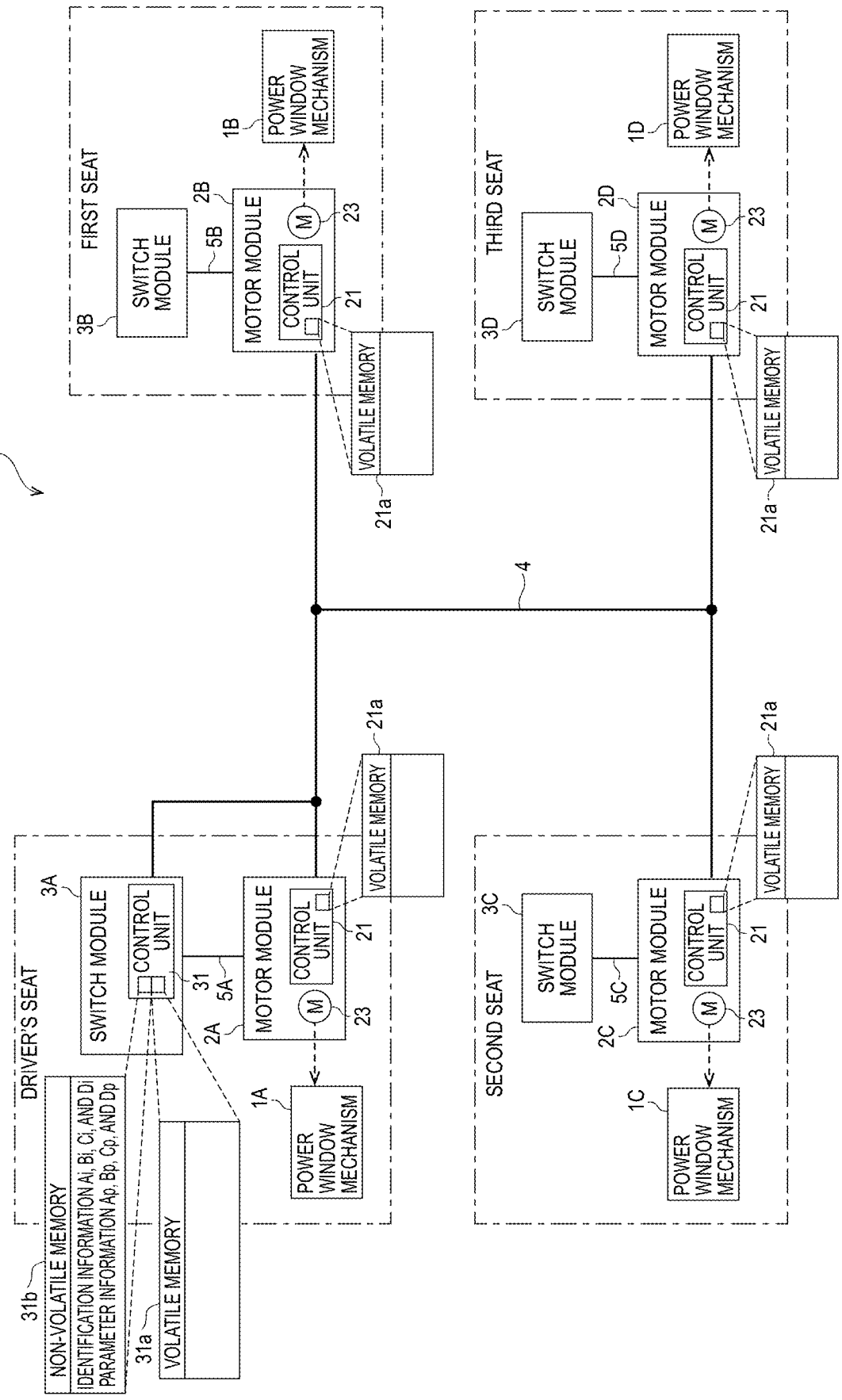
FIG. 11 is a diagram illustrating an initial state of the power window system in FIG. 1.
Figure 12:
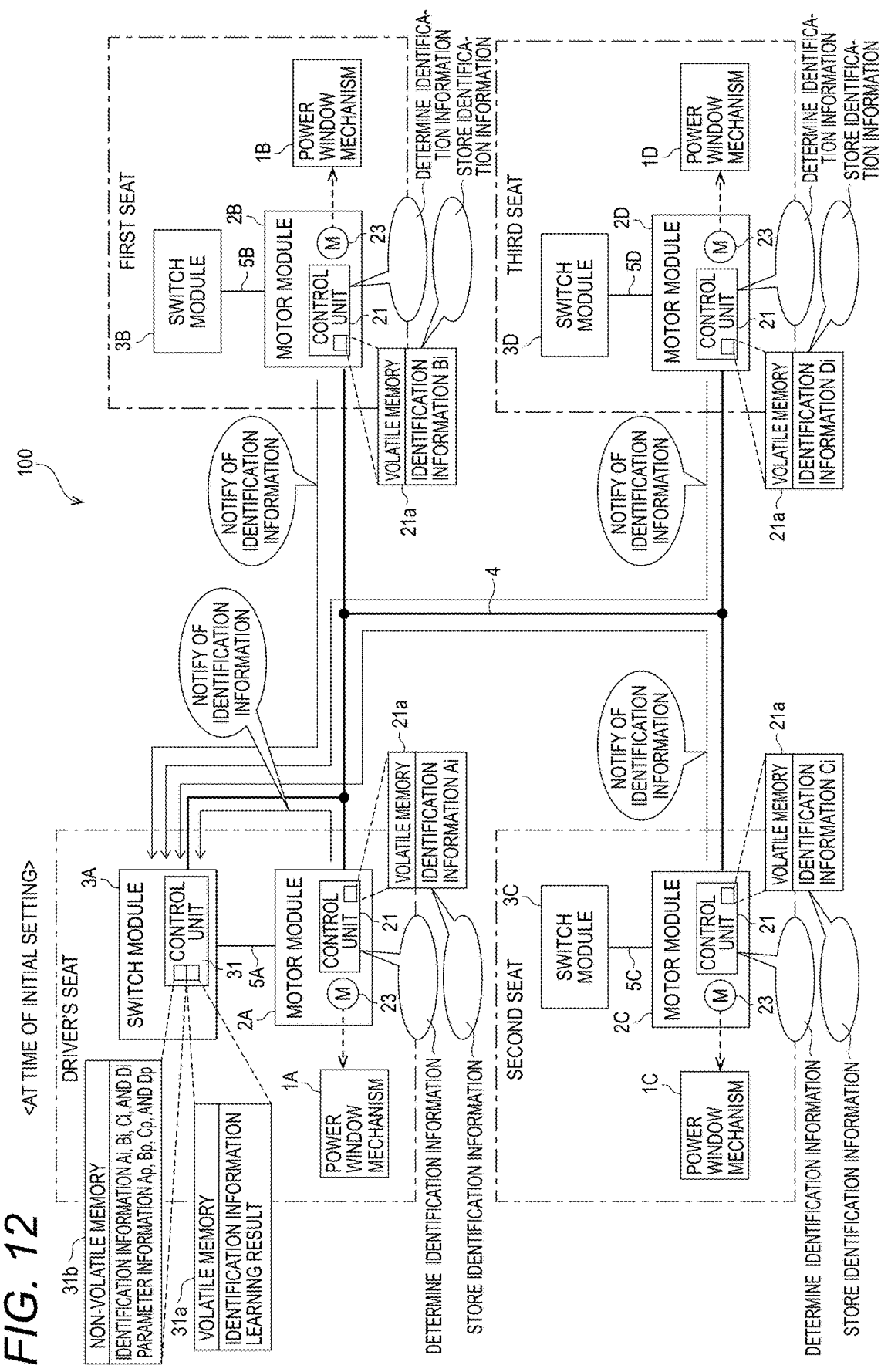
FIG. 12 is a diagram illustrating a communication state at a time of initial setting of the power window system in FIG. 1.

FIG. 6 is a flowchart illustrating an operation of the motor modules 2A, 2B, 2C, and 2D at the time of initial setting. FIG. 7 is a flowchart illustrating details of an identification information recognition process in FIG. 6. FIGS. 8 and 9 are diagrams illustrating a method of determining identification information of the motor module. FIG. 10 is a flowchart illustrating an operation of the switch module 3A in the driver's seat at the time of initial setting. FIG. 11 is a diagram illustrating an initial state of the power window system 100. FIGS. 12 to 15 are diagrams illustrating a communication state at the time of initial setting of the power window system 100.

The initial setting is executed in an initial state in which information is not stored in the volatile memory 21a of the motor modules 2A, 2B, 2C, and 2D, or the volatile memory 31a of the switch module 3A in the driver's seat. Each switch of the switch modules 3A, 3B, 3C, and 3D is not turned on at the time of initial setting.

As illustrated in FIG. 11, in the initial state, the nonvolatile memory 31b of the switch module 3A in the driver's seat stores identification information Ai, Bi, Ci, and Di of the power window mechanisms 1A, 1B, 1C, and 1D of the respective seats, and parameter information Ap, Bp, Cp, and Dp for controlling the motor 23 specialized for each of the power window mechanisms 1A, 1B, 1C, and 1D in advance so as to correspond to each other. The identification information Ai, Bi, Ci, and Di indicate in which seat each of the power window mechanisms 1A, 1B, 1C, and 1D is installed. The parameter information Ap, Bp, Cp, and Dp are information for controlling the drive of the motor 23 to cause the respective power window mechanisms 1A, 1B, 1C, and 1D to perform the opening and closing operation. The parameter information Ap, Bp, Cp, and Dp include information or the like for controlling an opening and closing amount of the window in each of the power window mechanisms 1A, 1B, 1C, and 1D, an opening and closing speed according to an opening and closing position, information for detecting pinching of a foreign matter in each of the power window mechanisms 1A, 1B, 1C, and 1D and releasing the pinching. The parameter information Ap, Bp, Cp, and Dp are examples of "control information" according to the embodiment of the present invention.

At the time of initial setting, the control unit 21 of the motor modules 2A, 2B, 2C, and 2D first executes an identification information recognition process (step S1 in FIG. 6). In this identification information recognition process, the control unit 21 first checks whether or not the identification information Ai, Bi, Ci, and Di of the power window mechanisms 1A, 1B, 1C, and 1D corresponding to the motor modules 2A, 2B, 2C, and 2D to which the control unit 21 belongs are already stored in the volatile memory 21a inside (step S11 in FIG. 7). When the identification information Ai, Bi, Ci, and Di are already stored in the volatile memory 21a (YES in step S11), the control unit 21 ends the identification information recognition process.

Further, when the identification information Ai, Bi, Ci, and Di of the corresponding power window mechanisms 1A, 1B, 1C, and 1D are not stored in the volatile memory 21a (NO in step S11), the control unit 21 detects voltage values applied to the input ports P1 and P2 according to a connection state with the corresponding switch modules 3A, 3B, 3C, and 3D (step S12).

As illustrated in FIG. 2, in a case where the harness 5A is connected to the connection units 25 and 35, the voltage value applied to the input port P1 is included in a range equal to or more than a predetermined value V2 and less than a predetermined value V3, due to a voltage division ratio of the resistors R1 and R4, as illustrated in FIG. 8 (YES in step S13 in FIG. 7). Further, as illustrated in FIG. 8, due to a voltage division ratio of the resistor R2 and the resistor R6, the voltage value applied to the input port P2 is also included in the range equal to or more than the predetermined value V2 and less than the predetermined value V3 (YES in step S14 in FIG. 7). In this case, the control unit 21 determines the identification information Ai indicating that the corresponding power window mechanism 1A is for the driver's seat as illustrated in FIG. 9 (step S15 in FIG. 7), stores the identification information Ai in the volatile memory 21a (see step S16, and FIG. 12), and ends the identification information recognition process.

In addition, as illustrated in FIG. 3, in a case where the harness 5B is connected to the connection units 25 and 35, the voltage value applied to the input port P1 is included in the range equal to or more than the predetermined value V2 and less than the predetermined value V3, due to a voltage division ratio of the resistors R1 and R4, as illustrated in FIG. 8 (YES in step S13 in FIG. 7). Further, due to a voltage division ratio of the resistor R2 and the resistor R5, the voltage value applied to the input port P2 is included in a range equal to or more than the predetermined value V1 and less than the predetermined value V2, as illustrated in FIG. 8 (YES in step S17 in FIG. 7). In this case, the control unit 21 determines the identification information Bi indicating that the corresponding power window mechanism 1B is for the first seat as illustrated in FIG. 9 (step S18 in FIG. 7), stores the identification information Bi in the volatile memory 21a (see step S16, and FIG. 12), and ends the identification information recognition process.

Further, as illustrated in FIG. 4, in a case where the harness 5C is connected to the connection units 25 and 35, due to a voltage division ratio of the resistors R1 and R3, the voltage value applied to the input port P1 is included in the range equal to or more than the predetermined value V1 and less than the predetermined value V2, as illustrated in FIG. 8 (YES in step S20 in FIG. 7). Further, due to a voltage division ratio of the resistor R2 and the resistor R6, the voltage value applied to the input port P2 is included in the range equal to or more than the predetermined value V2 and less than the predetermined value V3, as illustrated in FIG. 8 (YES in step S21 in FIG. 7). In this case, the control unit 21 determines the identification information Ci indicating that the corresponding power window mechanism 1C is for the second seat as illustrated in FIG. 9 (step S22 in FIG. 7), stores the identification information Ci in the volatile memory 21a (see step S16, and FIG. 12), and ends the identification information recognition process.

Further, as illustrated in FIG. 5, in a case where the harness 5D is connected to the connection units 25 and 35, due to a voltage division ratio of the resistors R1 and R3, the voltage value applied to the input port P1 is included in the range equal to or more than the predetermined value V1 and less than the predetermined value V2, as illustrated in FIG. 8 (YES in step S20 in FIG. 7). Further, as illustrated in FIG. 8, the voltage value applied to the input port P2 due to a voltage division ratio of the resistor R2 and the resistor R5 is also included in the range equal to or more than the predetermined value V1 and less than the predetermined value V2 (YES in step S23 in FIG. 7). In this case, the control unit 21 determines the identification information Di indicating that the corresponding power window mechanism 1D is for the third seat as illustrated in FIG. 9 (step S24 in FIG. 7), stores the identification information Di in the volatile memory 21a (see step S16, and FIG. 12), and ends the identification information recognition process.

On the other hand, even when the voltage value applied to the input port P1 is included in the range equal to or more than the predetermined value V2 and less than the predetermined value V3 (YES in step S13 in FIG. 7), the voltage value applied to the input port P2 may be less than the predetermined value V1 or equal to or more than the predetermined value V3 (NO in step S14, and NO in step S17). In this case, the control unit 21 cannot determine the identification information of the corresponding power window mechanisms 1A, 1B, 1C, and 1D, determines that there is an abnormality as illustrated in FIG. 9, outputs a signal indicating the abnormality (step S19 in FIG. 7), and ends the identification information recognition process. In step S19, for example, the control unit 21 may cause the communication unit 24 to notify the switch module 3A in the driver's seat or an electronic control unit (ECU) on the vehicle side of abnormality information indicating that the identification information of the corresponding power window mechanisms 1A, 1B, 1C, and 1D cannot be determined via the network 4, or may notify of the abnormality information by a display, a speaker, or the like provided in the vehicle.

Further, even when the voltage value applied to the input port P1 is included in the range equal to or more than the predetermined value V1 and less than the predetermined value V2 (YES in step S20 in FIG. 7), the voltage value applied to the input port P2 may be less than the predetermined value V1 or equal to or more than the predetermined value V3 (NO in step S21, and NO in step S23). Alternatively, the voltage value applied to the input port P1 may be less than the predetermined value V1 or equal to or more than the predetermined value V3 (NO in step S13, and NO in step S20). In these cases as well, the control unit 21 cannot determine the identification information of the corresponding power window mechanisms 1A, 1B, 1C, and 1D, determines that there is an abnormality as illustrated in FIG. 9, outputs a signal indicating the abnormality (step S19), and ends the identification information recognition process.

As described above, in the motor modules 2A, 2B, 2C, and 2D, the identification information Ai, Bi, Ci, and Di of the corresponding power window mechanisms 1A, 1B, 1C, and 1D are determined and stored in the volatile memory 21a, so that learning of the identification information Ai, Bi, Ci, and Di is completed. After the identification information recognition process is ended, the control unit 21 causes the communication unit 24 to notify the switch module 3A in the driver's seat of the identification information Ai, Bi, Ci, and Di of the corresponding power window mechanisms 1A, 1B, 1C, and 1D stored in the volatile memory 21a via the network 4 (step S2 in FIG. 6, and FIG. 12).

At the time of initial setting, the control unit 31 of the switch module 3A in the driver's seat executes each process in FIG. 10 each time the identification information Ai, Bi, Ci, and Di notified from the motor modules 2A, 2B, 2C, and 2D are received.

In the switch module 3A of the driver's seat, first, the identification information Ai, Bi, Ci, and Di notified from the motor modules 2A, 2B, 2C, and 2D via the network 4 is received by the communication unit 34 (YES in step S31 in FIG. 10). Then, the control unit 31 stores the identification information Ai, Bi, Ci, and Di in the volatile memory 31a (step S32, and "identification information learning result" in FIG. 12).

Figure 13:
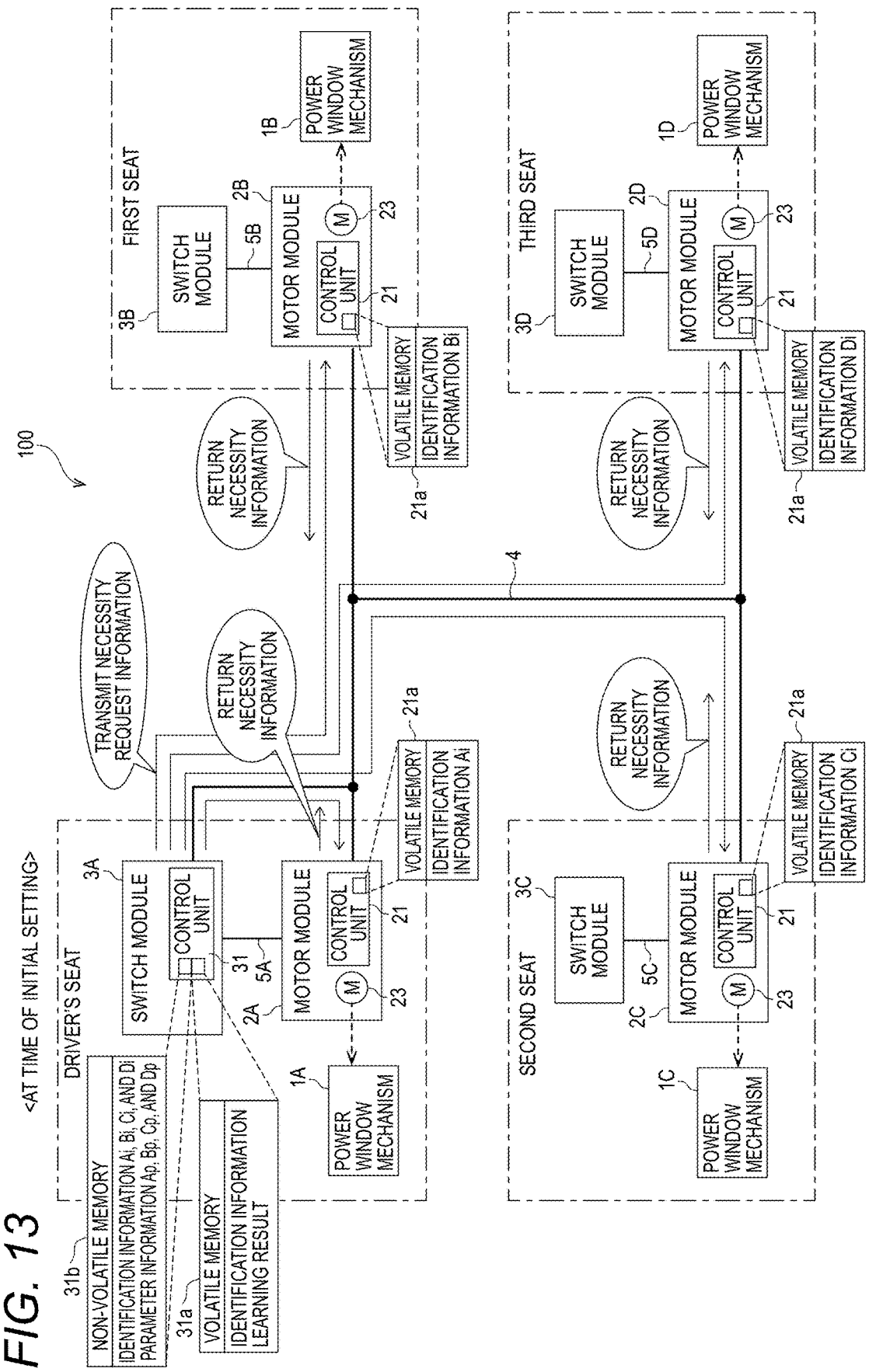
FIG. 13 is a diagram illustrating another communication state at the time of initial setting of the power window system in FIG. 1.
Figure 14:
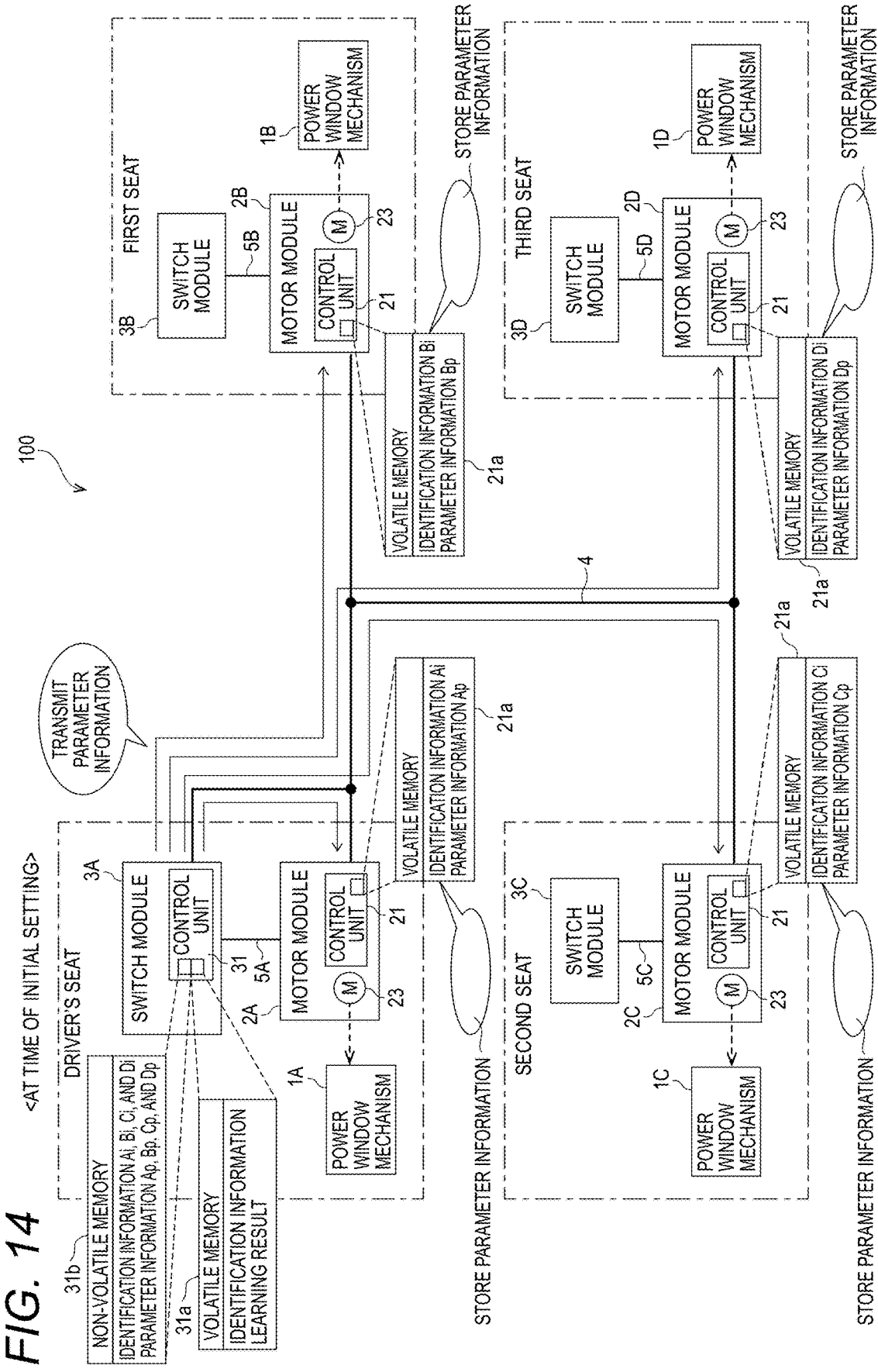
FIG. 14 is a diagram illustrating the communication state at the time of initial setting of the power window system in FIG. 1.

The control unit 31 causes the communication unit 34 to transmit necessity request information for requesting necessity information indicating whether or not the parameter information Ap, Bp, Cp, and Dp are necessary to the motor module 2A, 2B, 2C, and 2D via the network 4 (see step S33, and FIG. 13). At this time, the control unit 31 attaches the identification information Ai, Bi, Ci, and Di stored in the volatile memory 31a in step S32 to the necessity request information to be transmitted.

In the motor modules 2A, 2B, 2C, and 2D, the necessity request information transmitted from the switch module 3A in the driver's seat is received by the communication unit 24 via the network 4 (YES in step S3 in FIG. 6). Then, the control unit 21 collates the identification information attached to the necessity request information with the identification information Ai, Bi, Ci, and Di of the corresponding power window mechanisms 1A, 1B, 1C, and 1D stored in the volatile memory 21a. When the identification information attached to the necessity request information coincides with the identification information Ai, Bi, Ci, and Di stored in the volatile memory 21a (YES in step S3a), the control unit 21 checks whether or not the parameter information Ap, Bp, Cp, and Dp are already stored in the volatile memory 21a. At this time, when the parameter information Ap, Bp, Cp, and Dp are already stored in the volatile memory 21a (YES in step S4 in FIG. 6), the control unit 21 causes the communication unit 24 to return the necessity information indicating that the parameter information Ap, Bp, Cp, and Dp are unnecessary to the switch module 3A in the driver's seat via the network 4 (step S6), and ends the process. In step S6, the control unit 21 attaches the identification information Ai, Bi, Ci, and Di stored in the volatile memory 21*a* to the necessity information to be returned.

On the other hand, unless the parameter information Ap, Bp, Cp, and Dp are not stored in the volatile memory 21*a* (NO in step S4 in FIG. 6), the control unit 21 causes the communication unit 24 to return the necessity information indicating that the parameter information Ap, Bp, Cp, and Dp are necessary to the switch module 3A in the driver's seat via the network 4 (see step S5, and FIG. 13). At this time as well, the control unit 21 attaches the identification information Ai, Bi, Ci, and Di stored in the volatile memory 21*a* to the necessity information to be returned.

The switch module 3A in the driver's seat causes the communication unit 34 to receive the necessity information transmitted from the motor modules 2A, 2B, 2C, and 2D via the network 4 (YES in step S34 in FIG. 10). Then, the control unit 31 collates the identification information attached to the necessity information with the identification information Ai, Bi, Ci, and Di stored in the non-volatile memory 31*b*. When the identification information attached to the necessity information does not coincide with the identification information Ai, Bi, Ci, and Di stored in the non-volatile memory 31*b* (NO in step S35), the control unit 31 outputs a signal indicating an abnormality (step S36), and ends the process. In step S36, information, an image, or a sound indicating the abnormality may be notified by a display, a speaker, or the like provided in the vehicle. Further, in step S36, the control unit 31 may check whether or not the identification information which coincides with the identification information received in step S34 is stored in the volatile memory 31*a*, and may add abnormality information indicating that the identification information is not a management target and the like to the "identification information learning result" in the volatile memory 31*a* when the identification information is stored.

On the other hand, when the identification information attached to the necessity information coincides with the identification information Ai, Bi, Ci, and Di stored in the non-volatile memory 31*b* (YES in step S35), the control unit 31 checks the necessity information received from the motor modules 2A, 2B, 2C, and 2D. When the received necessity information does not indicate that the parameter information Ap, Bp, Cp, and Dp are necessary (NO in step S37), the process is ended.

Further, when the necessity information received from the motor modules 2A, 2B, 2C, and 2D indicates that the parameter information Ap, Bp, Cp, and Dp are necessary (YES in step S37), the control unit 31 reads the parameter information Ap, Bp, Cp, and Dp corresponding to the identification information Ai, Bi, Ci, and Di attached to the necessity information from the non-volatile memory 31*b*. The control unit 31 causes the communication unit 34 to transmit the parameter information Ap, Bp, Cp, and Dp via the network 4 (see step S38, and FIG. 14). At this time, the control unit 31 attaches the corresponding identification information Ai, Bi, Ci, and Di to the parameter information Ap, Bp, Cp, and Dp to be transmitted.

In the motor modules 2A, 2B, 2C, and 2D, the parameter information Ap, Bp, Cp, and Dp transmitted from the switch module 3A in the driver's seat are received by the communication unit 24 via the network (YES in step S7 in FIG. 6). Then, the control unit 21 collates the identification information attached to the received parameter information Ap, Bp, Cp, and Dp with the identification information Ai, Bi, Ci, and Di stored in the volatile memory 21*a*. When the identification information attached to the parameter information Ap, Bp, Cp, and Dp coincides with the identification information Ai, Bi, Ci, and Di stored in the volatile memory 21*a* (YES in step S7*a*), the control unit 21 stores the received parameter information Ap, Bp, Cp, and Dp in the volatile memory 21*a* (see step S8, and FIG. 14). As a result, in the motor modules 2A, 2B, 2C, and 2D, learning of the parameter information Ap, Bp, Cp, and Dp is completed.

Figure 15:
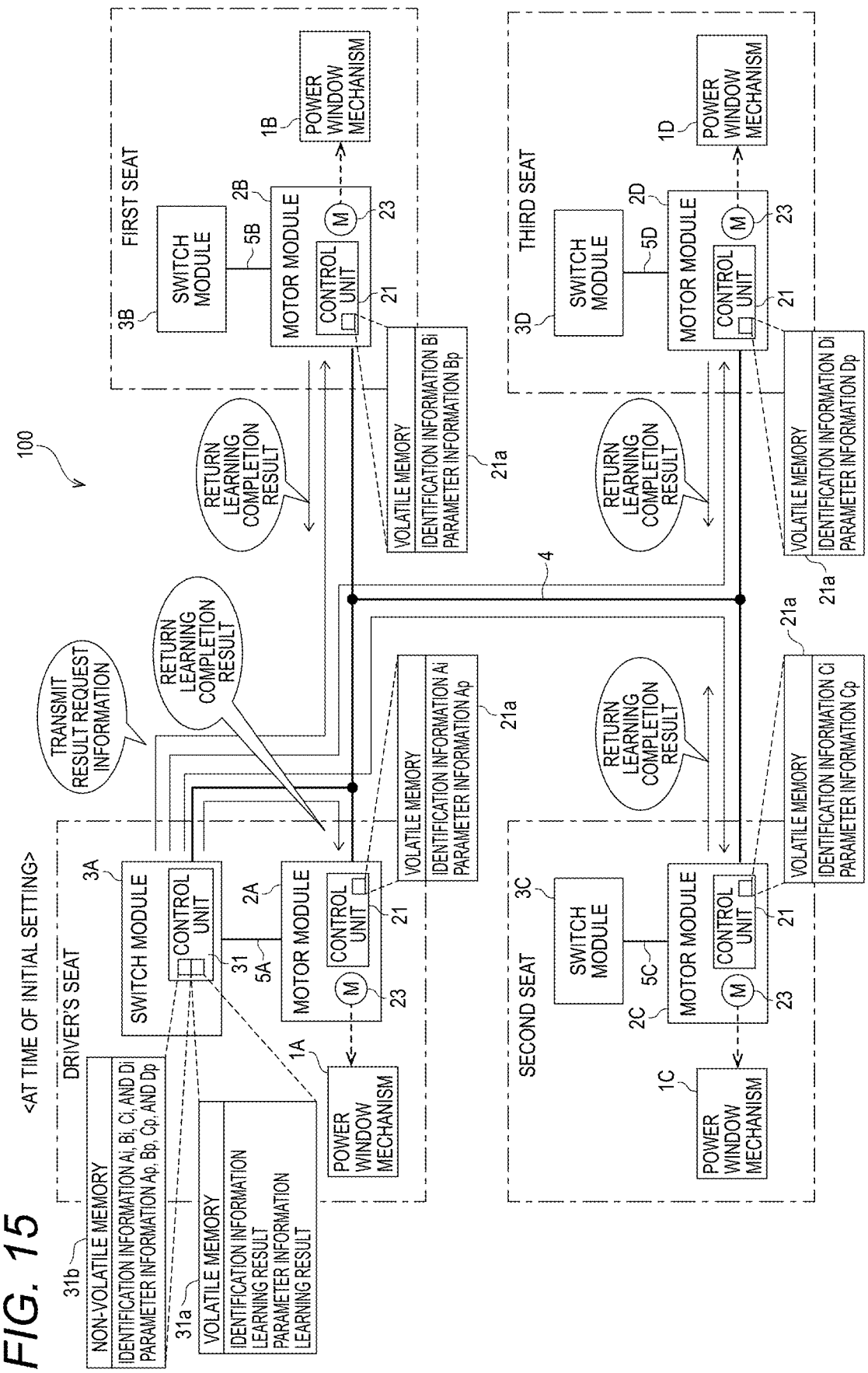
FIG. 15 is a diagram illustrating the communication state at the time of initial setting of the power window system in FIG. 1.

In the switch module 3A in the driver's seat, after transmitting the parameter information Ap, Bp, Cp, and Dp, the control unit 31 causes the communication unit 34 to transmit result request information for requesting a return of the result indicating that the learning of the parameter information is completed, via the network 4 (step S39). At this time, the control unit 31 attaches the same identification information Ai, Bi, Ci, and Di attached when the parameter information Ap, Bp, Cp, and Dp are transmitted, to the return request information to be transmitted (FIG. 15).

In the motor modules 2A, 2B, 2C, and 2D, the result request information transmitted from the switch module 3A in the driver's seat is received by the communication unit 24 via the network (YES in step S9 in FIG. 6). Then, the control unit 21 collates the identification information attached to the received result request information with the identification information Ai, Bi, Ci, and Di stored in the volatile memory 21*a*. When the identification information attached to the received result request information coincides with the identification information Ai, Bi, Ci, and Di stored in the volatile memory 21*a* (YES in step S9*a*), the control unit 21 checks whether or not learning of the parameter information is completed. At this time, when any of the parameter information Ap, Bp, Cp, and Dp is already stored in the volatile memory 21*a*, the control unit 21 determines that the learning of the parameter information is completed (YES in step S10). The control unit 21 causes the communication unit 24 to return the result indicating that the learning of the parameter information is completed to the switch module 3A in the driver's seat via the network 4 (see step S10*a*, and FIG. 15), and ends the process.

Further, when the parameter information Ap, Bp, Cp, and Dp are not stored in the volatile memory 21*a*, the control unit 21 determines that the learning of the parameter information is not completed (NO in step S10). When it is the first time to check that the learning of the parameter information is incomplete (NO in step S10*b*), the control unit 21 waits for the parameter information Ap, Bp, Cp, and Dp to be transmitted again from the switch module 3A in the driver's seat. On the other hand, when it is the second time to check that the learning of the parameter information Ap, Bp, Cp, and Dp is incomplete (NO in step S10) (YES in step S10*b*), the control unit 21 ends the process.

The switch module 3A in the driver's seat causes the communication unit 34 to receive the result indicating that the learning of the parameter information is completed from the motor modules 2A, 2B, 2C, and 2D within a predetermined time after the result request information is transmitted, via the network (YES in step S40 in FIG. 10). In this case, the control unit 31 collates the identification information attached to the learning completion result of the received parameter information with the identification information Ai, Bi, Ci, and Di stored in the volatile memory 21*a*. When the identification information attached to the received learning completion result coincides with the identification information Ai, Bi, Ci, and Di stored in the volatile memory 21*a* (YES in step S40*a*), the control unit 31 stores the learning completion result of the received parameter information in the volatile memory 31*a* (step S42, and "parameter information learning result" in FIG. 15), and ends the process. In step S42, the learning completion result of the parameter information Ap, Bp, Cp, and Dp transmitted in step S39 is associated with the corresponding identification information Ai, Bi, Ci, and Di.

Further, in a case where the communication unit 34 does not receive the learning completion result of the parameter information within the predetermined time after the result request information is transmitted (NO in step S40), when this is the first time (NO in step S41), the control unit 31 causes the communication unit 34 to transmit the parameter information Ap, Bp, Cp, and Dp again (step S38), and executes the subsequent process. On the other hand, in a case where the learning completion result of the parameter information is not received (NO in step S40) for the second time (YES in step S41), the process is ended.

Next, an operation of the power window system 100 during operation will be described.

Figure 16:
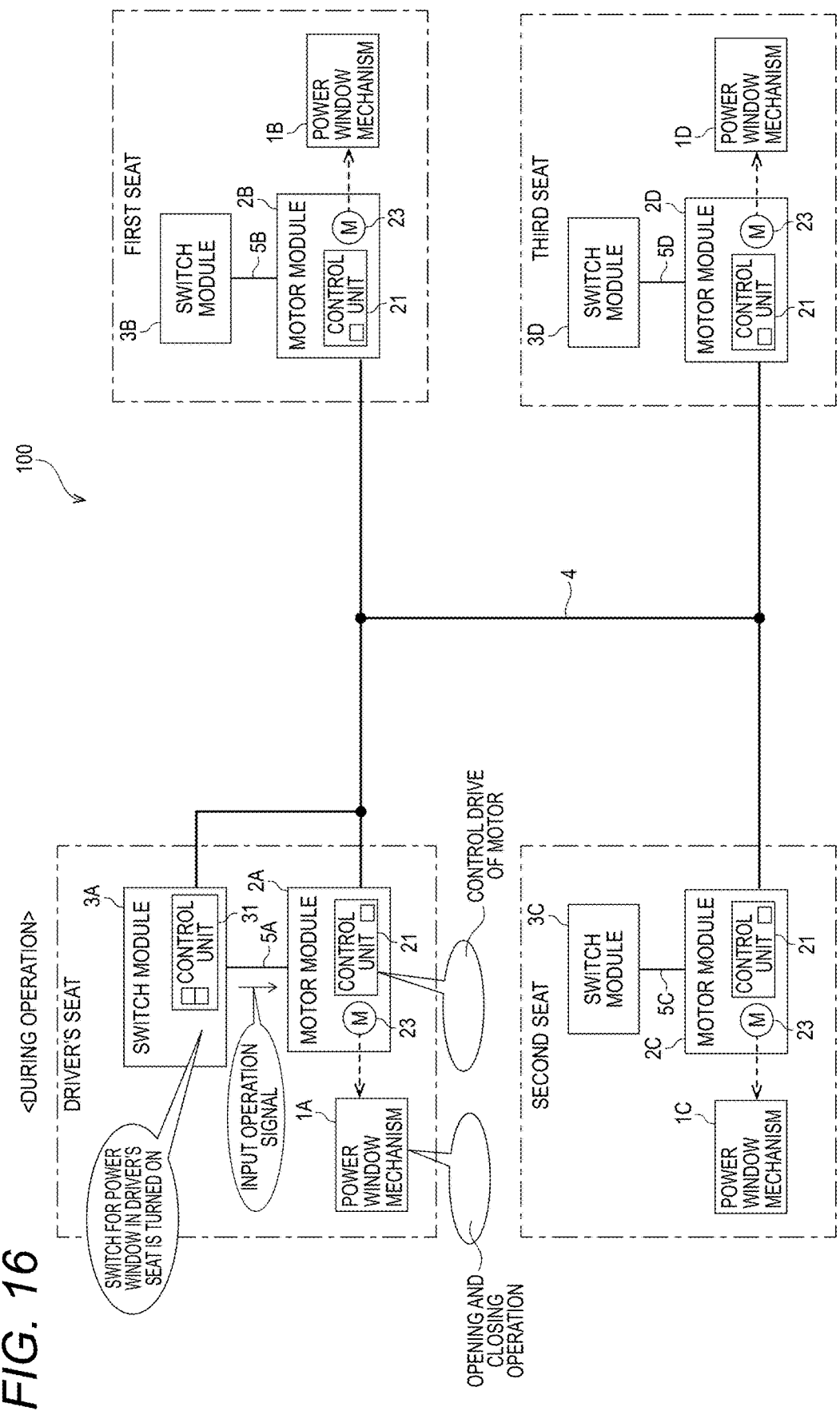
FIG. 16 is a diagram illustrating an operation and communication state of the power window system in FIG. 1 during operation.
Figure 17:
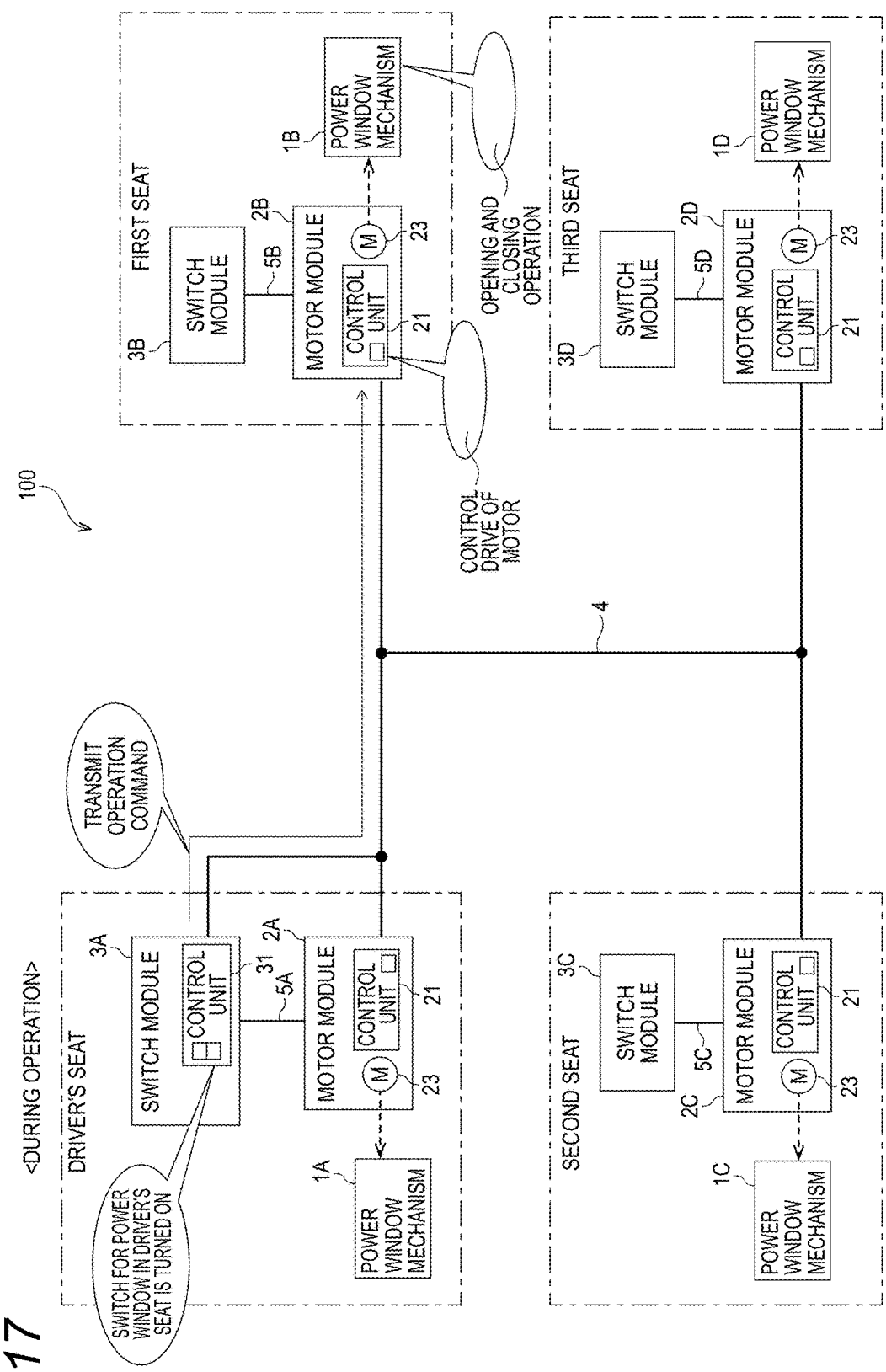
FIG. 17 is a diagram illustrating another operation and communication state of the power window system in FIG. 1 during operation.
Figure 18:
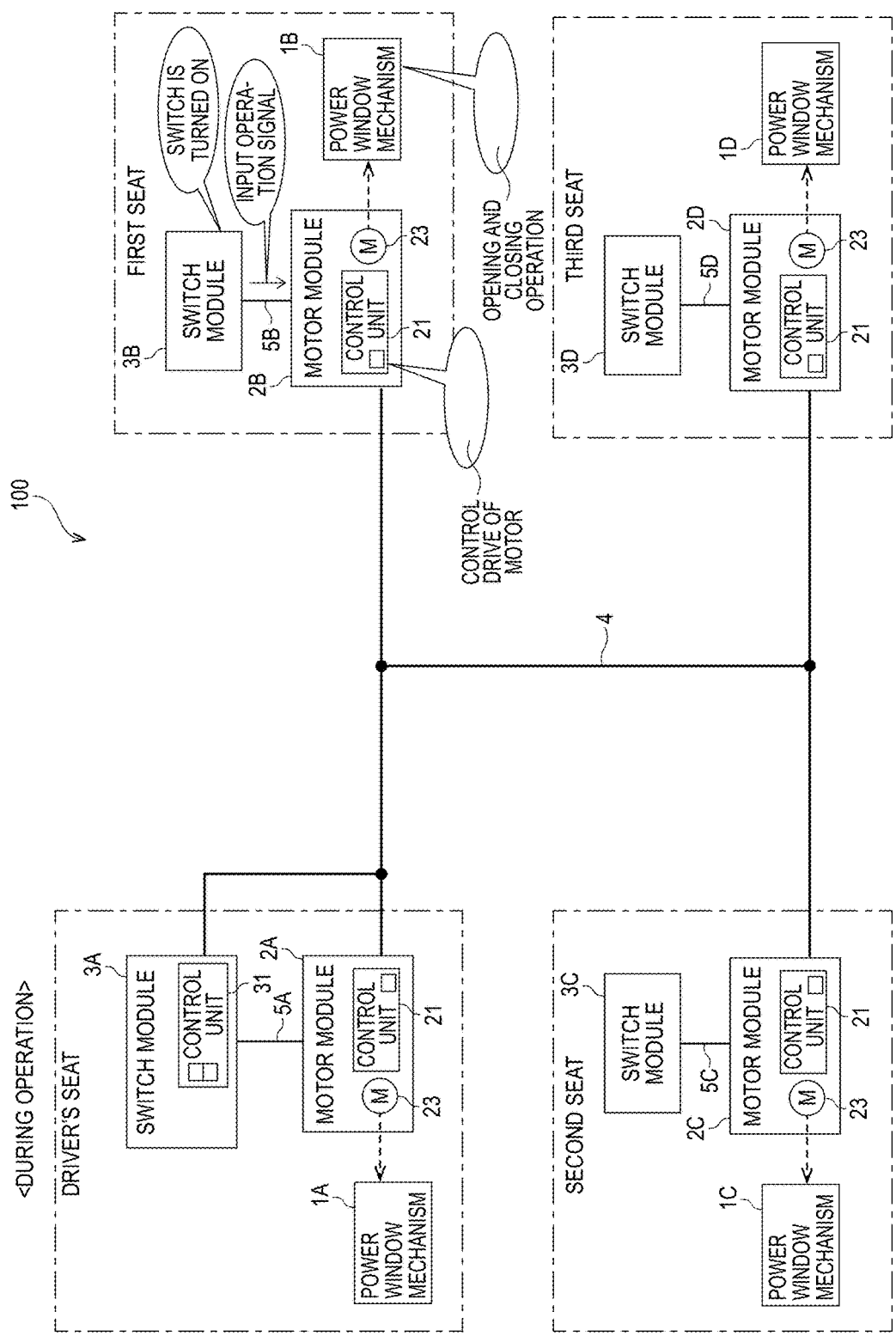
FIG. 18 is a diagram illustrating still another operation and communication state of the power window system in FIG. 1 during operation.

FIGS. 16 to 18 are diagrams illustrating an operation and a communication state of the power window system 100 during operation. The operation time is after the above-described initial setting is completed. During operation, the respective switches of the switch modules 3A, 3B, 3C, and 3D are turned on.

For example, as illustrated in FIG. 16, in a case where any of the switches W1, W2, and W3 (FIG. 2) for the power window mechanism 1A in the driver's seat provided in the switch module 3A in the driver's seat is turned on, an operation signal corresponding to the operation state is input from the switch module 3A to the control unit 21 via the harness 5A, and the connection unit 25 (FIG. 2) of the motor module 2A in the driver's seat. Then, in the motor module 2A, the control unit 21 controls the drive of the motor 23 by the driving unit 22, based on the operation signal and the parameter information Ap stored in the volatile memory 21a, and causes the power window mechanism 1A to perform the opening and closing operation.

Further, as illustrated in FIG. 17, in a case where any of the switches W4b, W5b, and W6b (FIG. 2) for the power window mechanism 1B of the first seat provided in the switch module 3A in the driver's seat is turned on, the control unit 31 causes the communication unit 34 to transmit operation command information for ordering the opening and closing operation of the power window mechanism 1B in the first seat according to the remote operation state via the network 4. At this time, the control unit 31 attaches the identification information Bi of the power window mechanism 1B in the first seat stored in the non-volatile memory 31b to the operation command information. In the motor module 2B of the first seat, when the operation command information transmitted from the switch module 3A of the driver's seat is received by the communication unit 24, the identification information attached to the operation command information is collated with the identification information Bi stored in the non-volatile memory 21a. When the identification information attached to the operation command information coincides with the identification information Bi stored in the non-volatile memory 21a, the control unit 21 controls the drive of the motor 23 by the driving unit 22, and causes the power window mechanism 1B to perform the opening and closing operation, based on the operation command information and the parameter information Bp stored in the volatile memory 21a.

Although not illustrated, even in a case where any of the switches W4c, W5c, W6c, W4d, W5d, and W6d (FIG. 2) for the power window mechanisms 1C and 1D of the other seats provided in the switch module 3A in the driver's seat is turned on, the control unit 31 causes the communication unit 34 to transmit the operation command information for ordering the opening and closing operation of the corresponding power window mechanisms 1C and 1D in the other seats according to the remote operation state, in a state of the identification information Ci and Di of the corresponding motor modules 2C and 2D in the other seats being attached, via the network 4. In the motor modules 2C and 2D, the operation command information transmitted from the switch module 3A in the driver's seat is received by the communication unit 24, and when the identification information attached to the operation command information coincides with the identification information (Ci or Di) stored in the non-volatile memory 21a, the control unit 21 controls the drive of the motor 23 by the driving unit 22, based on the operation command information and the parameter information Cp and Dp stored in the volatile memory 21a, and causes the corresponding power window mechanisms 1C and 1D to perform the opening and closing operation.

Further, as illustrated in FIG. 18, in a case where any of the switches W1, W2, and W3 (FIG. 3) for the power window mechanism 1B in the first seat, provided in the switch module 3B in the first seat is turned on, an operation signal according to the operation state is input from the switch module 3B to the control unit 21 via the harness 5B and the connection unit 25 (FIG. 3) of the motor module 2B in the first seat. Then, in the motor module 2B, based on the operation signal and the parameter information Bp stored in the volatile memory 21a, the control unit 21 controls the drive of the motor 23 by the driving unit 22, and causes the power window mechanism 1B to perform the opening and closing operation.

Although not illustrated, even in a case where any of the switches W1, W2, and W3 (FIGS. 4 and 5) for the power window mechanisms 1C and 1D in the other seats, provided in the switch modules 3C and 3D in the other seats are turned on, the operation signal according to the operation state is input from the operated switch modules 3C and 3D to the control unit 21 via the corresponding harnesses 5C and 5D and the connection unit 25 (FIGS. 4 and 5) of the motor modules 2C and 2D in the other seats. Then, in the motor modules 2C and 2D, based on the input operation signal and the parameter information (Cp or Dp) stored in the volatile memory 21a, the control unit 21 controls the drive of the motor 23 by the driving unit 22, and causes the power window mechanisms 1C and 1D to perform the opening and closing operation.

With the above embodiment, the motor modules 2A, 2B, 2C, and 2D of the respective seats determine the identification information Ai, Bi, Ci, and Di of the corresponding power window mechanisms 1A, 1B, 1C, and 1D provided in the same seat, based on the voltage applied to the input ports P1 and P2 according to the connection state with the switch modules 3A, 3B, 3C and 3D provided in the same seat. Instead of controlling the drive of the motor 23 based on the operation signal input from the switch modules 3A, 3B, 3C, and 3D, and operating the corresponding power window mechanisms 1A, 1B, 1C, and 1D, of the control information (parameter information or operation command information) transmitted from the switch module 3A in the driver's seat and received via the network 4, the motor modules 2A, 2B, 2C, and 2D controls the drive of the motor 23, and operates the corresponding power window mechanisms 1A, 1B, 1C, and 1D based on the control information to which information which coincides with the identification information Ai, Bi, Ci, and Di of the corresponding power window mechanisms 1A, 1B, 1C, and 1D is attached. Therefore, the motor modules 2A, 2B, 2C, and 2D control the drive of the motor 23, and appropriately operate the power window mechanisms 1A, 1B, 1C, and 1D, based on the control information for the corresponding power window mechanisms 1A, 1B, 1C, and 1D.

As a result, even when the plurality of power window mechanisms 1A, 1B, 1C, and 1D of identical types have physical individual differences, in order to cause each of the power window mechanisms 1A, 1B, 1C, and 1D to perform the opening and closing operation, by using the plurality of motor modules 2A, 2B, 2C, and 2D having the identical specifications and performance, it is possible to appropriately operate each of the power window mechanisms 1A, 1B, 1C, and 1D by each of the motor modules. Further, in order to cause the power window mechanism of each seat to perform the opening and closing operation regardless of a vehicle type or a seat position to be installed, by using the motor modules 2A, 2B, 2C, and 2D having the identical specifications and performance, it is possible to appropriately operate the power window mechanisms 1A, 1B, 1C and 1D by the motor module. Further, it is not necessary to store the identification information Ai, Bi, Ci, and Di of each of the power window mechanisms 1A, 1B, 1C, and 1D in the memory of each of the motor modules 2A, 2B, 2C, and 2D in advance, and it is only necessary to install any of the motor modules 2A, 2B, 2C, and 2D for any of the power window mechanisms 1A, 1B, 1C, and 1D. Therefore, it is not necessary to manage the motor modules 2A, 2B, 2C, and 2D separately by different component numbers of the plurality of motor modules 2A, 2B, 2C, and 2D, and the installation of the motor modules 2A, 2B, 2C, and 2D becomes easy. Therefore, it becomes easy to manage the plurality of motor modules 2A, 2B, 2C, and 2D, and it is possible to prevent handling from becoming complicated. Further, a memory area for storing the identification information Ai, Bi, Ci, and Di of the corresponding power window mechanisms 1A, 1B, 1C, and 1D in advance is secured for each of the motor modules 2A, 2B, 2C, and 2D, and it is not necessary to provide an expensive non-volatile memory.

Further, in the above embodiment, the motor modules 2A, 2B, 2C, and 2D, and the switch modules 3A, 3B, 3C and 3D installed in the same seat are respectively connected one-to-one by harnesses 5A, 5B, 5C, and 5D. Based on the voltage applied to the input ports P1 and P2 according to the connection state, the motor modules 2A, 2B, 2C, and 2D determine the identification information Ai, Bi, Ci, and Di of the corresponding power window mechanisms 1A, 1B, 1C, and 1D. Therefore, in order to determine the identification information Ai, Bi, Ci, and Di, for example, as compared with a case where the switch module 3A in the driver's seat and the motor module 2A, 2B, 2C, 2D are connected in series, a length of a wiring for connection (harness 5A, 5B, 5C, 5D) can be shortened to facilitate routing of the wiring.

Further, in the above embodiment, the identification information Ai, Bi, Ci, and Di of the power window mechanisms 1A, 1B, 1C, and 1D of the respective seats, and the parameter information Ap, Bp, Cp, and Dp for controlling the motor 23 specialized for the power window mechanisms 1A, 1B, 1C, and 1D of the respective seats are stored in advance in the non-volatile memory 31b of the switch module 3A in the driver's seat to correspond with each other. At the time of initial setting, the switch module 3A in the driver's seat attaches the identification information Ai, Bi, Ci, and Di corresponding to the parameter information Ap, Bp, Cp, and Dp, and transmits the parameter information Ap, Bp, Cp, and Dp to the motor modules 2A, 2B, 2C, and 2D via the network 4. Therefore, the motor modules 2A, 2B, 2C, and 2D of the respective seats reliably acquire the parameter information Ap, Bp, Cp, and Dp for the corresponding power window mechanisms 1A, 1B, 1C, and 1D, and stores the parameter information Ap, Bp, Cp, and Dp in the volatile memory 21a inside.

Further, during operation, the switch module 3A in the driver's seat attaches the identification information Bi, Ci, and Di of the power window mechanisms 1B, 1C, and 1D in the other seats to operation command information for ordering the opening and closing operation of the power window mechanisms 1B, 1C, and 1D in the other seats corresponding to the operation state of the switches W4b, W5b, W6b, W4c, W5c, W6c, W4d, W5d, and W6d, and transmits the operation command information to the motor modules 2B, 2C, and 2D in the other seats via the network 4. Therefore, the motor modules 2B, 2C, and 2D in the other seats can reliably acquire the operation command information for the corresponding power window mechanisms 1B, 1C, and 1D. Further, during operation, operation signals corresponding to the operation states of the switches W1, W2, and W3 of the switch modules 3A, 3B, 3C, and 3D in the respective seats are input to the corresponding motor modules 2A, 2B, 2C, and 2D via the connection unit 25.

Therefore, in the motor modules 2A, 2B, 2C, and 2D of the respective seats, based on the operation command information for the power window mechanisms 1B, 1C, and 1D received from the switch module 3A in the driver's seat or the operation signal input from the corresponding switch modules 3A, 3B, 3C, and 3D, and the parameter information Ap, Bp, Cp, and Dp stored in the volatile memory 21a, it is possible to control the drive of the motor 23, and to more appropriately cause the corresponding power window mechanisms 1A, 1B, 1C, and 1D to perform the opening and closing operation. Further, it is not necessary to provide a non-volatile memory having a large storage capacity capable of storing the parameter information Ap, Bp, Cp, and Dp in each of the motor modules 2A, 2B, 2C, and 2D.

Further, in the above embodiment, the switch module 3A in the driver's seat transmits necessity request information for requesting necessity information indicating whether or not the parameter information Ap, Bp, Cp, and Dp are necessary, to the motor modules 2A, 2B, 2C, and 2D via the network 4. The motor modules 2A, 2B, 2C, and 2D receive the necessity request information, determine necessity of the parameter information Ap, Bp, Cp, and Dp, attach the identification information Ai, Bi, Ci, and Di of the power window mechanisms 1A, 1B, 1C, and 1D corresponding the necessity information indicating the determination result to the necessity information, and return the necessity information to the switch module 3A in the driver's seat. Further, the switch module 3A in the driver's seat receives the necessity information from the motor modules 2A, 2B, 2C, and 2D, and checks whether or not the necessity information indicates that the parameter information Ap, Bp, Cp, and Dp are necessary and the identification information Ai, Bi, Ci, and Di attached to the necessity information coincide with the identification information Ai, Bi, Ci, and Di stored in the non-volatile memory 31b.

In a case where the identification information Ai, Bi, Ci, and Di attached to the necessity information and the identification information Ai, Bi, Ci, and Di stored in the non-volatile memory 31b coincide with each other, the switch module 3A in the driver's seat attaches the coincident identification information Ai, Bi, Ci, and Di to the corresponding parameter information Ap, Bp, Cp, and Dp, and transmits the parameter information Ap, Bp, Cp, and Dp to the motor modules 2A, 2B, 2C, and 2D. Therefore, when the motor module 2A, 2B, 2C, and 2D are not stored in the volatile memory 21a (in the initial state) or the like, the motor modules 2A, 2B, 2C, and 2D determine that the parameter information Ap, Bp, Cp, and Dp are necessary, and reliably receive the corresponding parameter information Ap, Bp, Cp, and Dp from the switch module 3A in the driver's seat, and store the parameter information Ap, Bp, Cp, and Dp in the volatile memory 21a.

Further, when the identification information Ai, Bi, Ci, and Di attached to the necessity information and the identification information Ai, Bi, Ci, and Di stored in the non-volatile memory 31b do not coincide with each other, the switch module 3A in the driver's seat does not transmit the parameter information Ap, Bp, Cp, and Dp to the motor modules 2A, 2B, 2C, and 2D, and outputs a signal indicating an abnormality. Therefore, it is possible to prevent the unsupported motor module from erroneously learning the parameter information. In addition, it is possible to notify that there is an abnormality in the learning process of the parameter information Ap, Bp, Cp, and Dp in the motor modules 2A, 2B, 2C, and 2D.

In the embodiment of the present invention, various embodiments other than the embodiment described above can be adopted.

For example, in the above-described embodiment, the example in which the resistors R3 to R6 and the terminals Tc1, Tc2, To1, To2, Ta1, and Tg1 are provided in the switch modules 3A, 3B, 3C, and 3D so as to be connected with the switches W1, W2, and W3, and the identification information Ai, Bi, Ci, and Di are determined by the motor modules 2A, 2B, 2C, and 2D is described, and the embodiment of the present invention is not limited to this. Instead of the switches W1, W2, W3, a plurality of resistors and terminals having the same manner may be provided in the switch module to be connected with other electronic components or electrical circuits in the switch module, such as lighting LEDs and submersion detection circuits, and the identification information of the corresponding power window mechanism may be determined in the motor module.

Further, for example, between the connection unit 25 of the motor module and the connection unit 35 of the switch module, the number of terminals on one connection unit is greater than the number of terminals on the other connection unit and the open-circuited and short-circuited state of the terminal of the one connection unit is changed according to the connection state of the terminal of the one connection unit and the terminal of the other connection unit, so the motor module may determine the identification information of the corresponding power window mechanism.

Further, the above-described embodiment, the example in which the parameter information Ap, Bp, Cp, and Dp for motor control specialized for the power window mechanisms 1A, 1B, 1C, and 1D of the respective seats are delivered from the switch module 3A in the driver's seat to the motor modules 2A, 2B, 2C, and 2D in the respective seats is described, the embodiment of the present invention is not limited to this. In addition to this, for example, a non-volatile memory is provided in each of the motor modules 2A, 2B, 2C, and 2D, and the identification information Ai, Bi, Ci, and Di of all the power window mechanisms 1A, 1B, 1C, and 1D, and the parameter information Ap, Bp, Cp, and Dp may be stored in the non-volatile memory in advance in association with each other. In this case, after each of the motor modules 2A, 2B, 2C, and 2D determines the identification information Ai, Bi, Ci, and Di of the corresponding power window mechanisms 1A, 1B, 1C, and 1D, the parameter information Ap, Bp, Cp, and Dp corresponding to the identification information Ai, Bi, Ci, and Di may be read from the non-volatile memory.

Further, in the above-described embodiment, the example in which the four power window mechanisms 1A, 1B, 1C, and 1D, motor modules 2A, 2B, 2C, and 2D, and switch modules 3A, 3B, 3C, and 3D are respectively provided in the power window system 100 is described, and the number of these may be other than four.

Further, in the above-described embodiment, the switch module 3A in the driver's seat is used as the management module, or switch modules having the same configuration as the switch modules 3B, 3C, and 3D in the other seats may be used as the switch module in the driver's seat, and a management module different from the switch modules may be provided.

Further, in the above embodiment, the power window mechanisms 1A, 1B, 1C, and 1D are given as examples of the vehicle-mounted device, or the embodiment of the present invention can also be applied to a motor module, a management module, and a vehicle-mounted device control system for operating other vehicle-mounted devices.

While the invention has been described with respect to a limited number of embodiments, those skilled in the art, having benefit of this disclosure, will appreciate that other embodiments can be devised which do not depart from the scope of the invention as disclosed herein. According, the scope of the invention should be limited only by the attached claims.

The invention claimed is:

1. A motor module comprising:
 a motor that is a power source of a vehicle-mounted device mounted on a vehicle;
 a driving unit that drives the motor;
 a control unit that operates the driving unit and controls the drive of the motor to operate the vehicle-mounted device;
 a communication unit that performs communication via a network built in the vehicle; and
 a connection unit to which an operation module that operates for operating the vehicle-mounted device is connected without going through the network,
 wherein the control unit
  determines identification information of the corresponding vehicle-mounted device, based on a voltage applied according to a connection state between the motor module and the operation module,
  controls the drive of the motor by the driving unit to operate the vehicle-mounted device, based on control information to which information which coincides with the identification information of the vehicle-mounted device is attached, among pieces of control information transmitted from a management module that manages the motor module and received by the communication unit, and
  controls the drive of the motor by the driving unit to operate the vehicle-mounted device, based on an operation signal input from the operation module according to an operation state of the operation module via the connection unit.

2. The motor module according to claim 1,
 wherein the control unit
  determines identification information of the vehicle-mounted device based on a voltage applied according to a one-to-one connection state between the motor module and the operation module, stores the identification information in a memory inside, and causes the communication unit to notify the management module via of the identification information the network, causes the communication unit to receive each of parameter information for motor control specialized for the corresponding vehicle-mounted device and operation command information for ordering an operation of the vehicle-mounted device as the control information transmitted from the management module, and stores, among the pieces of parameter information, the parameter information to which information which coincides with the identification information of the vehicle-mounted device stored in the memory is attached in the memory, and controls the drive of the motor by the driving unit to operate the vehicle-mounted device, based on operation command information to which information which coincides with the identification information of the vehicle-mounted device is attached, among the pieces of operation command information received from the management module, or the operation signal input from the operation module, and the parameter information stored in the memory.

3. The motor module according to claim 1, wherein the vehicle-mounted device includes a power window mechanism provided in a predetermined seat of the vehicle, the management module includes a first switch module that is provided at a position away from the predetermined seat and remotely operates the power window mechanism, the operation module includes a second switch module provided in the predetermined seat, and the control unit controls the drive of the motor by the driving unit to cause the power window mechanism to perform an opening and closing operation, based on operation command information to which identification information which coincides with the identification information of the vehicle-mounted device is attached, among pieces of operation command information for ordering the opening and closing operation of the power window mechanism, which is transmitted from the first switch module and received by the communication unit according to a remote operation state of the first switch module, and controls the drive of the motor by the driving unit to cause the power window mechanism to perform the opening and closing operation, based on an operation signal input from the second switch module via the connection unit according to an operation state of the second switch module.

4. A management module that communicates with a motor module including a motor which is a power source of a vehicle-mounted device mounted on a vehicle via a network built in the vehicle to manage the motor module, the management module comprising:

a storage unit in which identification information of the vehicle-mounted device is stored in advance, wherein the management module receives identification information of the vehicle-mounted device transmitted from the motor module via the network; and in a case where the received identification information coincides with the identification information stored in the storage unit, attaches the identification information to control information for controlling a drive of the motor and operating the vehicle-mounted device, and transmits the control information to the motor module via the network.

5. The management module according to claim 4, wherein parameter information for motor control specialized for the vehicle-mounted device for the motor module to control the drive of the motor and operate the vehicle-mounted device is stored in advance to correspond to the identification information of the vehicle-mounted device in the storage unit, in a case where the identification information of the vehicle-mounted device received from the motor module coincides with the identification information of the vehicle-mounted device stored in the storage unit, the parameter information corresponding to the identification information and operation command information for ordering an operation of the vehicle-mounted device are respectively transmitted to the motor module via the network, as the control information, and in a case where the received identification information of the vehicle-mounted device does not coincide with the identification information of the vehicle-mounted device stored in the storage unit, a signal indicating an abnormality is output.

6. The management module according to claim 5, wherein the vehicle-mounted device includes a power window mechanism provided in a predetermined seat of the vehicle, the management module includes a switch module that is provided at a position away from the predetermined seat and that remotely operates the power window mechanism, and the operation command information in a state where identification information of the power window mechanism stored in the storage unit is attached to the operation command information for ordering an opening and closing operation of the power window mechanism according to a remote operation state of the switch module is transmitted to the motor module via the network.

7. A vehicle-mounted device control system comprising:

a motor module that includes a motor which is a power source of a vehicle-mounted device mounted on a vehicle, and controls a drive of the motor to operate the vehicle-mounted device; and a management module that manages the motor module, the motor module and the management module communicating with each other via a network built in the vehicle, wherein the motor module determines identification information of the vehicle-mounted device, and transmits the identification information to the management module via the network, the management module includes a storage unit in which identification information of the vehicle-mounted device is stored in advance, and receives the identification information of the vehicle-mounted device transmitted from the motor module via the network, in a case where the received identification information coincides with the identification information stored in the storage unit, attaches the identification information to control information for controlling the drive of the motor and operating the vehicle-mounted device, and transmits the control information to the motor module via the network, and the motor module
controls the drive of the motor to operate the vehicle-mounted device, based on control information to which information which coincides with the determined identification information of the vehicle-mounted device is attached, among the pieces of control information received from the management module via the network.

8. The vehicle-mounted device control system according to claim 7, further comprising:
an operation module that operates for operating the vehicle-mounted device,
wherein the motor module
includes a connection unit to which the operation module is connected without going through the network,
determines identification information of the vehicle-mounted device based on a voltage applied according to a connection state between the motor module and the operation module, stores the identification information in a memory inside, and transmits the identification information to the management module via the network,
parameter information for motor control specialized for the vehicle-mounted device for the motor module to control the drive of the motor and operate the vehicle-mounted device is stored in advance in the storage unit of the management module to correspond to the identification information of the vehicle-mounted device,
the management module
receives the identification information of the vehicle-mounted device transmitted from the motor module via the network, and
in a case where the received identification information coincides with the identification information stored in the storage unit, transmits the parameter information corresponding to the identification information to the motor module via the network, as the control information,
the motor module receives the parameter information transmitted from the management module via the network, and stores parameter information to which information which coincides with the identification information of the vehicle-mounted device stored in the memory is attached in the memory, among the pieces of parameter information,
the management module transmits, as the control information, operation command information for ordering an operation of the vehicle-mounted device to the motor module via the network,
the motor module controls the drive of the motor by the driving unit to operate the vehicle-mounted device, based on operation command information to which information which coincides with the identification information of the vehicle-mounted device stored in the memory is attached, among the pieces of operation command information received from the management module, or the operation signal input from the operation module, and the parameter information stored in the memory.

9. The vehicle-mounted device control system according to claim 8,
wherein the management module transmits request information for requesting necessity information indicating whether or not the parameter information is necessary to the motor module via the network,
when receiving the request information via the network, the motor module determines necessity of the parameter information, and returns the necessity information to the management module via the network, in a state in which the identification information of the vehicle-mounted device stored in the memory is attached to the necessity information indicating the determination result, and
the management module receives the necessity information returned from the motor module via the network, and transmits the parameter information to the motor module via the network, in a state in which the identification information is attached to the parameter information corresponding to the identification information, in a case where the received necessity information indicates that the parameter information is necessary, and the identification information of the vehicle-mounted device attached to the received necessity information coincides with the identification information of the vehicle-mounted device stored in the storage unit.

10. The vehicle-mounted device control system according to claim 8,
wherein the vehicle-mounted device includes a power window mechanism provided in a predetermined seat of the vehicle,
the management module includes a first switch module that is provided at a position away from the predetermined seat and remotely operates the power window mechanism,
the first switch module transmits the operation command information to the motor module via the network, in a state where the identification information of the power window mechanism is attached to the operation command information for ordering an opening and closing operation of the power window mechanism according to a remote operation state,
the motor module controls the drive of the motor to cause the power window mechanism to perform the opening and closing operation, based on operation command information to which information which coincides with the determined identification information of the vehicle-mounted device is attached, among the pieces of operation command information transmitted from the first switch module and received via the network,
the operation module includes a second switch module provided in the predetermined seat, and
the motor module controls the drive of the motor to cause the power window mechanism to perform the opening and closing operation, based on an operation signal input according to an operation state of the second switch module via the connection unit.

* * * * *